(12) United States Patent
Charisius et al.

(10) Patent No.: US 7,055,130 B2
(45) Date of Patent: May 30, 2006

(54) METHODS AND SYSTEMS FOR IDENTIFYING DEPENDENCIES BETWEEN OBJECT-ORIENTED ELEMENTS

(75) Inventors: Dietrich Charisius, Stuttgart (DE); Peter Coad, Raleigh, NC (US)

(73) Assignee: Borland Software Corporation, Cupertino, CA (US)

( * ) Notice: Subject to any disclaimer, the term of this patent is extended or adjusted under 35 U.S.C. 154(b) by 926 days.

(21) Appl. No.: 09/839,644

(22) Filed: Apr. 20, 2001

(65) Prior Publication Data

US 2002/0097253 A1    Jul. 25, 2002

Related U.S. Application Data

(63) Continuation-in-part of application No. 09/680,063, filed on Oct. 4, 2000.

(60) Provisional application No. 60/199,046, filed on Apr. 21, 2000, provisional application No. 60/157,826, filed on Oct. 5, 1999, provisional application No. 60/199,046, filed on Apr. 21, 2000.

(51) Int. Cl.
*G06F 9/44* (2006.01)

(52) U.S. Cl. ...................... 717/108; 717/116; 717/126

(58) Field of Classification Search ................ 717/108, 717/106, 100, 109, 116, 128
See application file for complete search history.

(56) References Cited

U.S. PATENT DOCUMENTS

| 6,292,933 B1 * | 9/2001 | Bahrs et al. | 717/107 |
| 6,550,057 B1 * | 4/2003 | Bowman-Amuah | 717/126 |
| 6,601,233 B1 * | 7/2003 | Underwood | 717/102 |

FOREIGN PATENT DOCUMENTS

| EP | 1 030 242 A2 | 8/2000 |
| EP | 1 030 252 A1 | 8/2000 |

OTHER PUBLICATIONS

SNAP Foundation Template Using the SNAP Development Environment, Template Software 1997, Chapters 1-4.*
Template Software Rolls Out Corporate and Product Growth Strategies at Solutions '97 Conference, PR Newswire, Apr. 3, 1997, 2 pages.*
Template Software Strengthens Core Product Family With Ease of Use and Functional Enhancement that Promotes Unparralled Software Resuse, Jun. 23, 1997, PR Newswire, 2 pages.*

(Continued)

*Primary Examiner*—Todd Ingberg
(74) *Attorney, Agent, or Firm*—MacCord Mason PLLC

(57) ABSTRACT

Methods and systems consistent with the present invention provide an improved software development tool that represents multiple dependencies between a dependent node and a defining node in a project as a single dependency link. Methods and systems consistent with the present invention also identify and display details regarding each dependency in a project upon request by the user.

135 Claims, 41 Drawing Sheets

OTHER PUBLICATIONS

Visual Modeling with Rational Rose and UML, Terry Quantrani, Dec. 18, 1997, Chapters 1-12.*

Erich Gamma, et al., "Design Patterns Elements of Reusable James Martin, "Principles of Object-Oriented Analysis and Design," Prentice Hall, Oct. 29, 1992, Chapters 1-22.

M. M. Burnett, et al., "Visual Object-Oriented Programming Concepts and Environments," Manning Publishing, 1994, Chapters 1-12. Object-Oriented Software," Addison-Wesley, 1994, Chapter 1.

Wayne Citrin, et al., "A Formal Definition of Control Semantics in a Completely Visual Language," Sep. 1993, Mac World.

RR Software Inc., "JANUS/ADA 95 Compiler User Manual," Version 5.1 Dec. 1995, pp. 6-1 to 6-48.

F. Penz, "Visual Programming in the ObjectWorld," Journal of Visual Languages and Computing, Mar. 1991, vol. 2, p. 17-41.

L. Vanhelsuwe, "Mastering JAVABEANS," Sybex, Chapter 2.

David Withey McIntyre, "A Visual Method for Generating Iconic Programming Environments," UMI Dissertation Services.

Unified Modeling Language (UML) UML Booch & OMT Quick Reference for Rational Rose 4.0.

Rational Rose Corporation, Rational Rose Release 4.0 (Nov. 1996) "Using Rational Rose 4.0" Chapters 3-11, pp. 11-207.

Object-Oriented Software Engineering, A Use Case Driven Approach 1996 Jacobson, Ivar Part I Chapters 1-5, Part II Chapters 6-12, Part III Chapters 13-16, pp. 1-500.

UML Distilled Applying the Standard Object Modeling Language 1997 Martin Fowler with Kendall Scott, Chapters 1-11, pp. 1-173.

* cited by examiner

FIG. 20

```
                         ┌─ 2002
public class Sale
{
/**
* @link aggregation
* @associates <{SaleDetail}>
*/
private Vector lnkSaleDetail;

public void addItem( Product aProd)
{
                    └─ 2008  └─ 2004  └─ 2006
} public SaleDetail( String barCode)
{
Product item = Product.lookUp( barCode );
}
}
         └─ 2010              └─ 2012
```

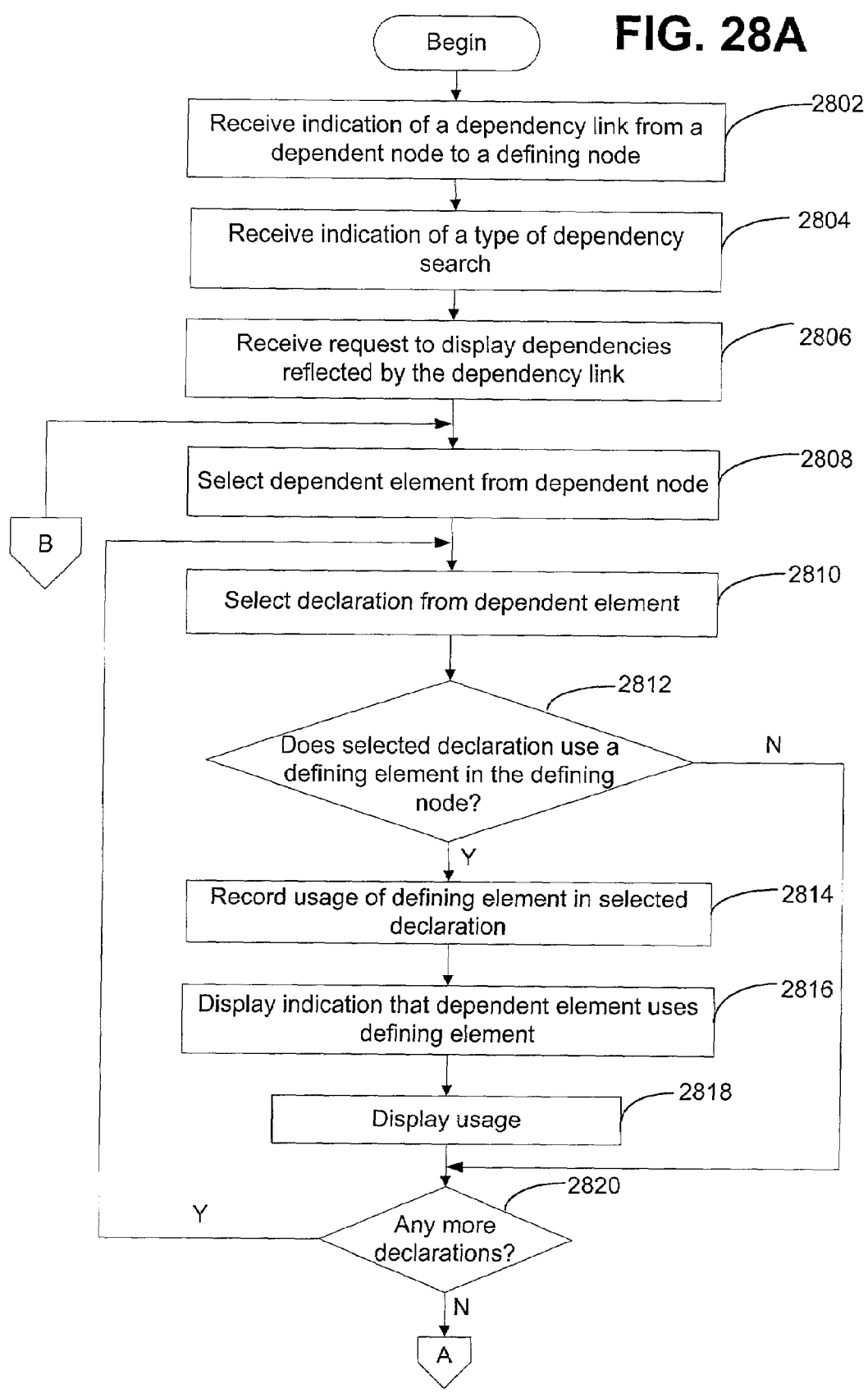

FIG. 30

```
3002
   \
public class POSFrame extends JFrame {
    // Problem Domain Object CashSale currentSale = new CashSale();
    // Dummy list of store items
                                3004
    ProductDesc[] products;
    // Sale Detail Table Column Header
3006
    private final String[] colNames = {"Item", "Name", "Unit", "Qty", "Price"};
    private final static int ADDED_DETAIL = 0;
    private final static int REMOVED_DETAIL = 1;
    // Dummy list of cashiers private final static String[] cashiers =
        {
    "Jim","Lucy","Steve","Sarah","Jon","Buddy","Bettie","Sue","John","Ted"};
    NumberFormat currencyFormat = NumberFormat.getCurrencyInstance();
```

```
                            3014
            3010            )    3016
    private void setUpProducts() {
    products = new ProductDesc[10];
    products[0] = new ProductDesc("1", "Pepsi 24-pack", "Pepsi 24", new BigDecimal(3.99));
    products[1] = new ProductDesc("2", "Lays Ridges", "Lays", new BigDecimal(1.99));
    products[2] = new ProductDesc("3", "Vienna Sausages", "Vienna Sausages",
3008    new BigDecimal(2.99));
    products[3] = new ProductDesc("4", "White Popcorn", "White Popcorn",
3012    new BigDecimal(1.30));
    products[4] = new ProductDesc("5", "Soy Burgers", "Soy Burger", new BigDecimal(5.99));
    products[5] = new ProductDesc("6", "Cat Chow", "Cat Chow", new BigDecimal(9.99));
    products[6] = new ProductDesc("7", "Puppy Chow", "Puppy Chow", new BigDecimal(12.99));
    products[7] = new ProductDesc("8", "Finch Food", "Finch Food", new BigDecimal(1.59));
    products[8] = new ProductDesc("9", "Rice Krispies", "Rice Krispies", new BigDecimal(3.30));
    products[9] = new ProductDesc("10", "Fruit Loops", "Fruit Loops", new BigDecimal(3.49));
```

FIG. 31

```
                    ┌─ 3102
public class ProductDesc {

/** Use it if you need to identify Products as specific types. */
    private int type;

/** Product name. For example: Goetze's Caramel Cremes */
    private String name;

/** This is the unique identifying number. Something like a UPC for retail
    products. */
    private String itemNumber;

/** Default price. */
    private BigDecimal defaultPrice;

/** Some prose describing the product in all its glory. */
    private String description;

/**
     *List of prices. If this list has elements, then they are checked. Otherwise,
        the default price is used. <p>
     * @supplierCardinality 1..*
     * @associates <b>ProductPrice</b>
     */
    private Vector priceObjects;

/* ==========================================================
     * Constructors
     * ========================================================== */

/** Constructor requires all parameters. Type is defaulted to 0 since we
        aren't using it. */
    public ProductDesc(String anItemNum, String aDesc, String aName,
        BigDecimal aPrice) {
        type = 0; // not currently used
        itemNumber = anItemNum;
        description = aDesc;
        name = aName;
        defaultPrice = aPrice;
        priceObjects = new Vector();
    } // END ProductDesc(...)
```

3104 points to the constructor.

METHODS AND SYSTEMS FOR IDENTIFYING DEPENDENCIES BETWEEN OBJECT-ORIENTED ELEMENTS

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements," filed on Oct. 4, 2000;

U.S. patent application Ser. No. 09/839,045, entitled "Methods and Systems for Generating Source Code for Object Oriented Elements," and filed on the same date herewith;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," and filed on the same date herewith;

U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/839,580, entitled "Diagrammatic Control of a Software in a Version Control System," and filed on the same date herewith;

U.S. patent application Ser. No. 09/839,578, entitled "Navigation Links in Generated Documentation," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates to a method and system for developing software. More particularly, the invention relates to methods and systems for identifying dependencies between object-oriented elements in a project.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file that, when compiled, forms a sequence of instructions to be run by the data processing system. The repository 108 generates the IL 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the entire source code 104 is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. In addition, the software development tool is designed for use with more than one programming language.

The software development tool consistent with the present invention provides a developer with a visual cue of multiple dependencies between two nodes in a project via a single dependency link between the nodes. Thus, the software development tool saves significant programming development time and aids in the production of error free code. The software development tool also identifies and displays the details for each dependency in a project to assist the developer in analyzing the code. Thus, the developer does not need to search the code to identify the particular dependencies that exist between various object-oriented elements in the project.

In accordance with methods consistent with the present invention, a method is provided in a data processing system. The data processing system has a dependent node, a defining node, and a plurality of dependencies between the dependent node and the defining node. The method comprises the steps of displaying a graphical representation of the dependent node, displaying a graphical representation of the defining node, receiving an indication to identify a dependency between the dependent node and the defining node, and in response to receiving the indication to identify the dependency, representing the plurality of dependencies as a number of links that is less than a number of the dependencies between the dependent node and the defining node.

In accordance with methods consistent with the present invention, a method is provided in a data processing system. The data processing system has a plurality of nodes, and each of the plurality of nodes has corresponding code. The method comprises the steps of displaying a graphical representation of the plurality of nodes, determining whether the code corresponding to a first of the plurality of nodes contains a first use of a second of the plurality of nodes, and when it is determined that the code corresponding to the first node contains the first use of the second node, determining whether the code corresponding to the first node contains a second use of the second node, and when it is determined that the code corresponding to the first node contains the second use of the second node, displaying a dependency link between the graphical representation of the first node and the graphical representation of the second node.

In accordance with methods consistent with the present invention, a method is provided in a data processing system. The data processing system has a plurality of nodes, and each of the plurality of nodes has corresponding code. The method comprises the steps of receiving an indication of a first of the plurality of nodes, receiving an indication of a second of the plurality of nodes, determining whether the code corresponding to the first node contains a first use and a second use of the second node, and when it is determined that the code corresponding to the first node contains the first use and the second use of the second node, displaying a dependency link between the graphical representation of the first node and the graphical representation of the second node.

In accordance with methods consistent with the present invention, a method is provided in a data processing system. The data processing system has a plurality of nodes, and each of the plurality of nodes has corresponding code. The method comprises the steps of receiving an indication of a first of the plurality of nodes, receiving an indication of a second of the plurality of nodes, determining whether the code corresponding to the first node contains a use of the second node, and when it is determined that the code corresponding to the first node contains the use of the second node, displaying the usage of the second node by the first node.

In accordance with articles of manufacture consistent with the present invention, a computer-readable medium is provided. The computer-readable medium contains instructions for controlling a data processing system to perform a method. The data processing system has a dependent node, a defining node, and a plurality of dependencies between the dependent node and the defining node. The method comprises the steps of displaying a graphical representation of the dependent node, displaying a graphical representation of the defining node, receiving an indication to identify a dependency between the dependent node and the defining node, and in response to receiving the indication to identify the dependency, representing the plurality of dependencies as a number of links that is less than a number of the dependencies between the dependent node and the defining node.

In accordance with articles of manufacture consistent with the present invention, a computer-readable medium is provided. The computer-readable medium contains instructions for controlling a data processing system to perform a method. The data processing system has a plurality of nodes, and each of the plurality of nodes has corresponding code. The method comprises the steps of displaying a graphical representation of the plurality of nodes, determining whether the code corresponding to a first of the plurality of nodes contains a first use of a second of the plurality of nodes, and when it is determined that the code corresponding to the first node contains the first use of the second node, determining whether the code corresponding to the first node contains a second use of the second node, and when it is determined that the code corresponding to the first node contains the second use of the second node, displaying a dependency link between the graphical representation of the first node and the graphical representation of the second node.

In accordance with articles of manufacture consistent with the present invention, a computer-readable medium is provided. The computer-readable medium contains instructions for controlling a data processing system to perform a method. The data processing system has a plurality of nodes, and each of the plurality of nodes has corresponding code. The method comprises the steps of receiving an indication of a first of the plurality of nodes, receiving an indication of a second of the plurality of nodes, determining whether the code corresponding to the first node contains a first use and a second use of the second node, and when it is determined that the code corresponding to the first node contains the first use and the second use of the second node, displaying a dependency link between the graphical representation of the first node and the graphical representation of the second node.

In accordance with articles of manufacture consistent with the present invention, a computer-readable medium is provided. The computer-readable medium contains instructions for controlling a data processing system to perform a method. The data processing system has a plurality of nodes, and each of the plurality of nodes has corresponding code. The method comprises the steps of receiving an indication of a first of the plurality of nodes, receiving an indication of a second of the plurality of nodes, determining whether the code corresponding to the first node contains a use of the second node, and when it is determined that the code corresponding to the first node contains the use of the second node, displaying the usage of the second node by the first node.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 20 depicts exemplary code corresponding to a dependent class that uses another defining class, resulting in a dependency between the dependent class and the defining class;

FIG. 28A–C depict a flow diagram illustrating an exemplary process performed by the software development tool in FIG. 2 to identify and display all dependencies reflected by a single dependency link between a dependent node and a defining node;

FIG. 30 depicts exemplary code corresponding to a class associated with the dependent package, where the exemplary code reflects a dependency on a second class associated with the defining package;

FIG. 31 depicts exemplary code corresponding to a class associated with the dependent package, where the exemplary code reflects a dependency on a second class associated with the defining package;

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
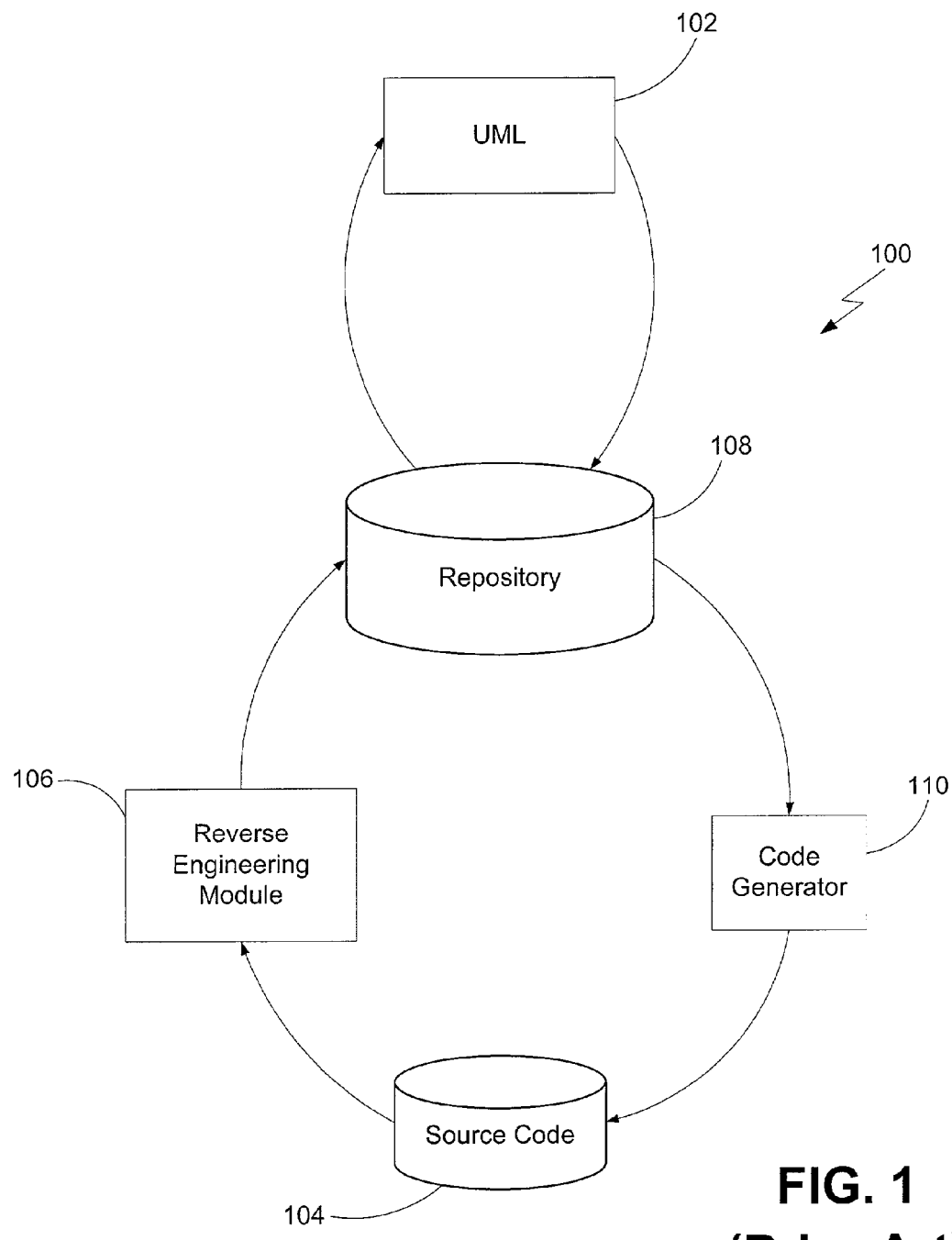
FIG. 1 depicts a conventional software development tool.
Figure 2:
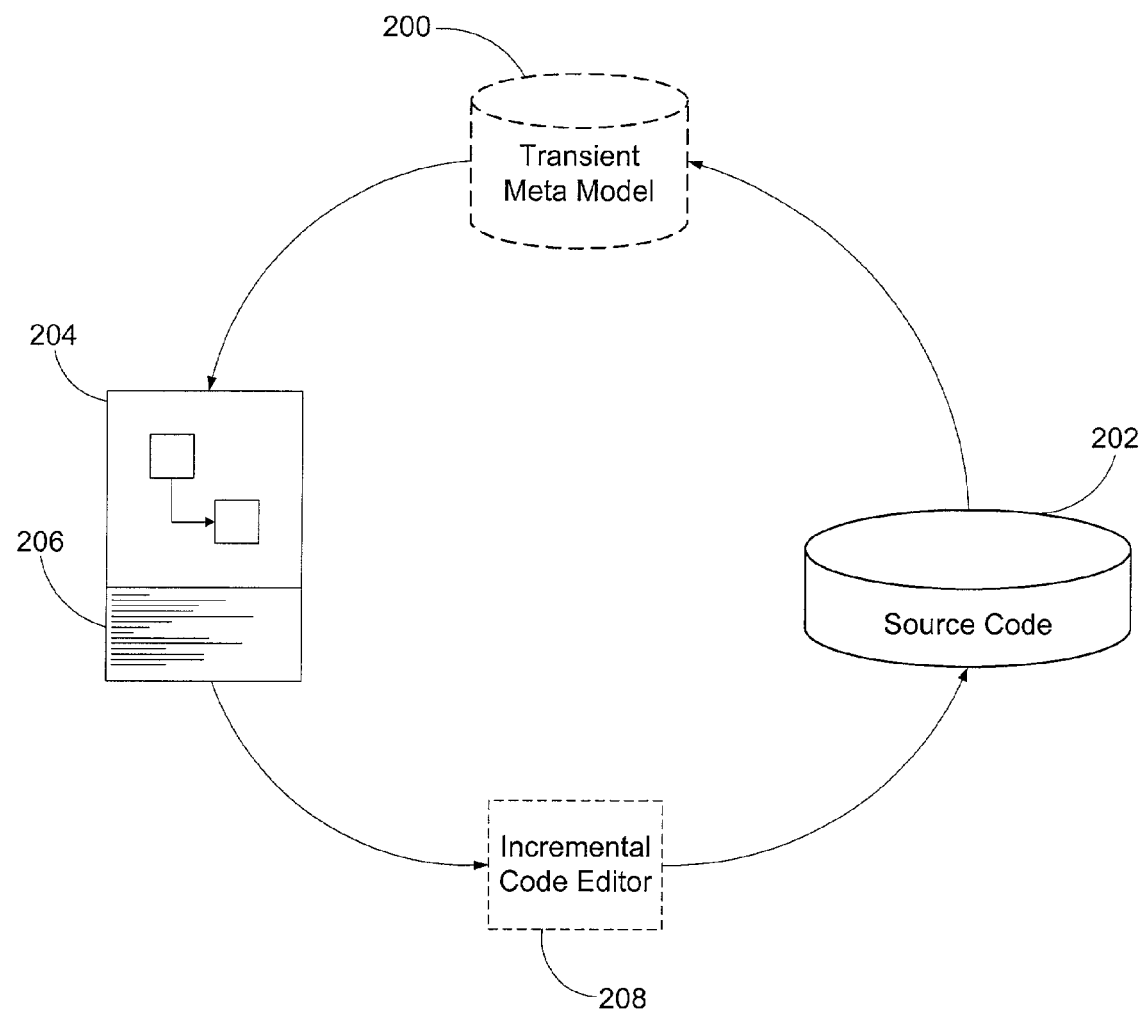
FIG. 2 depicts an overview of a software development tool in accordance with methods and systems consistent with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
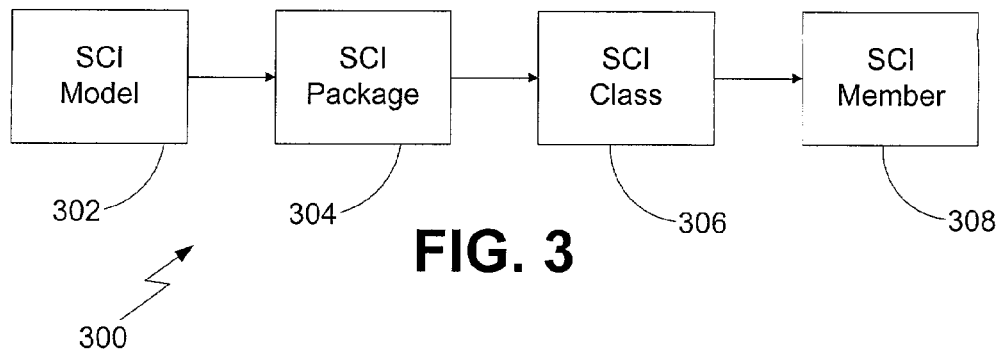
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
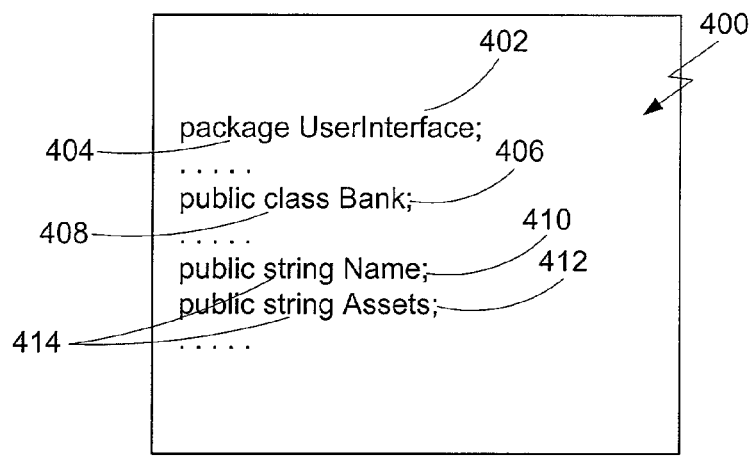
FIG. 4 depicts representative source code.
Figure 5:
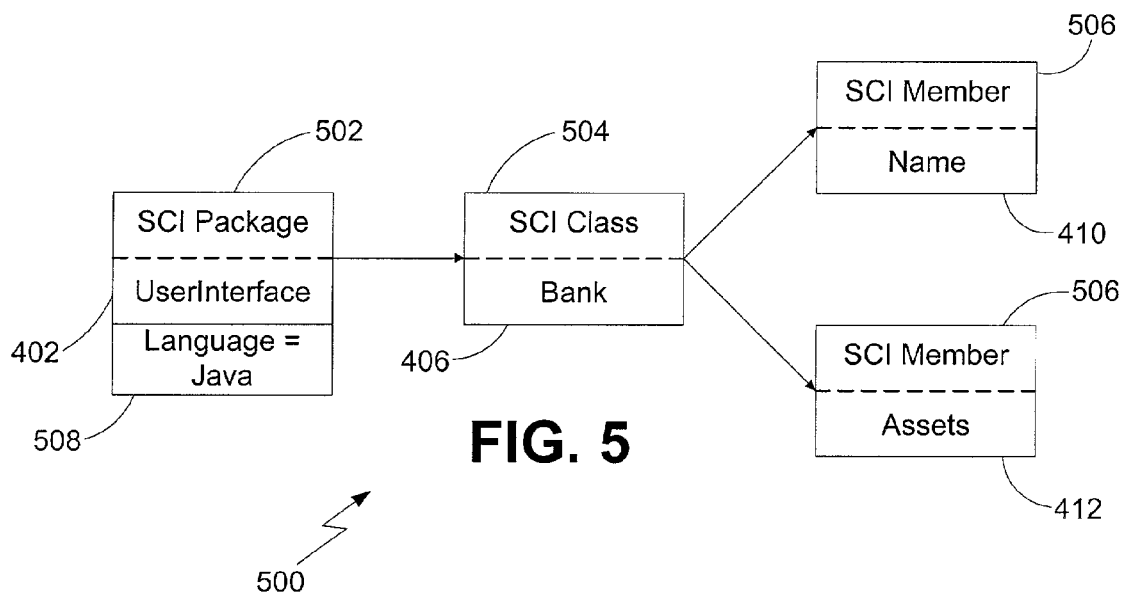
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
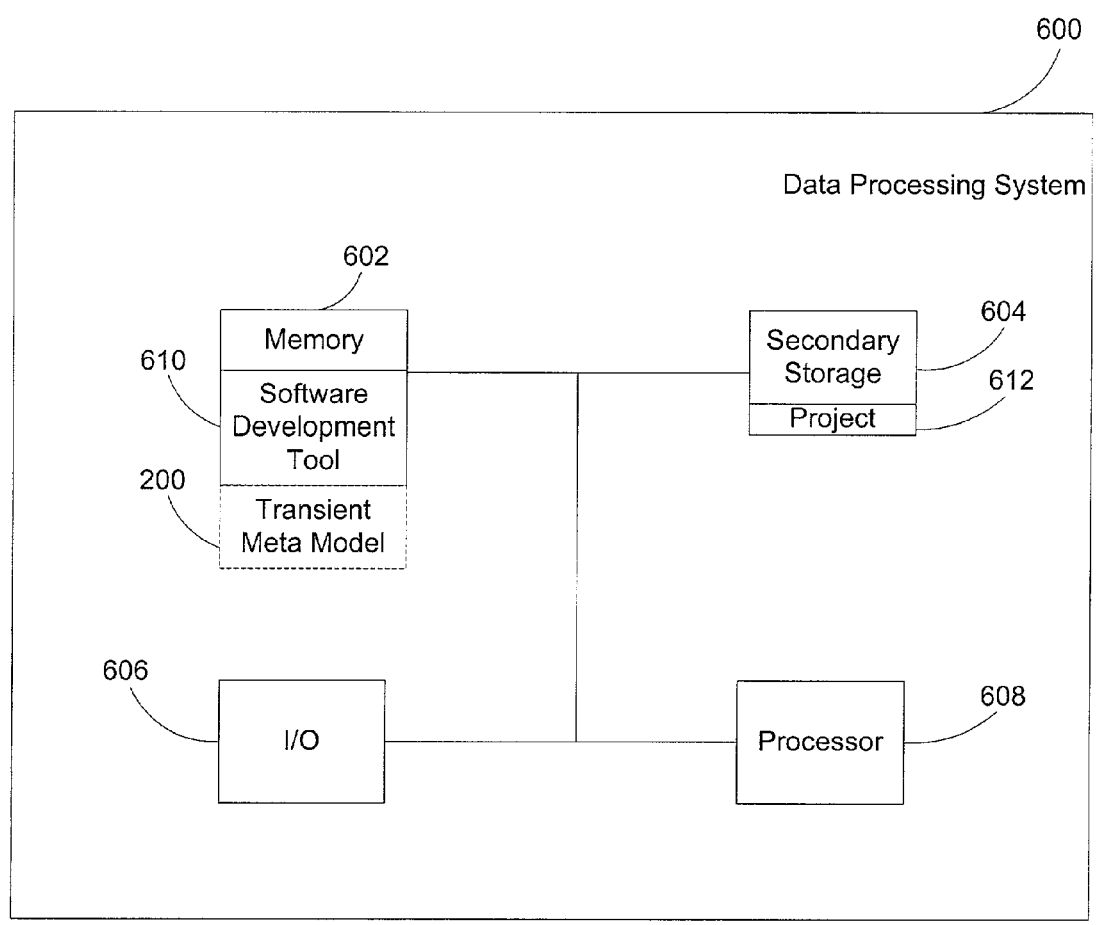
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
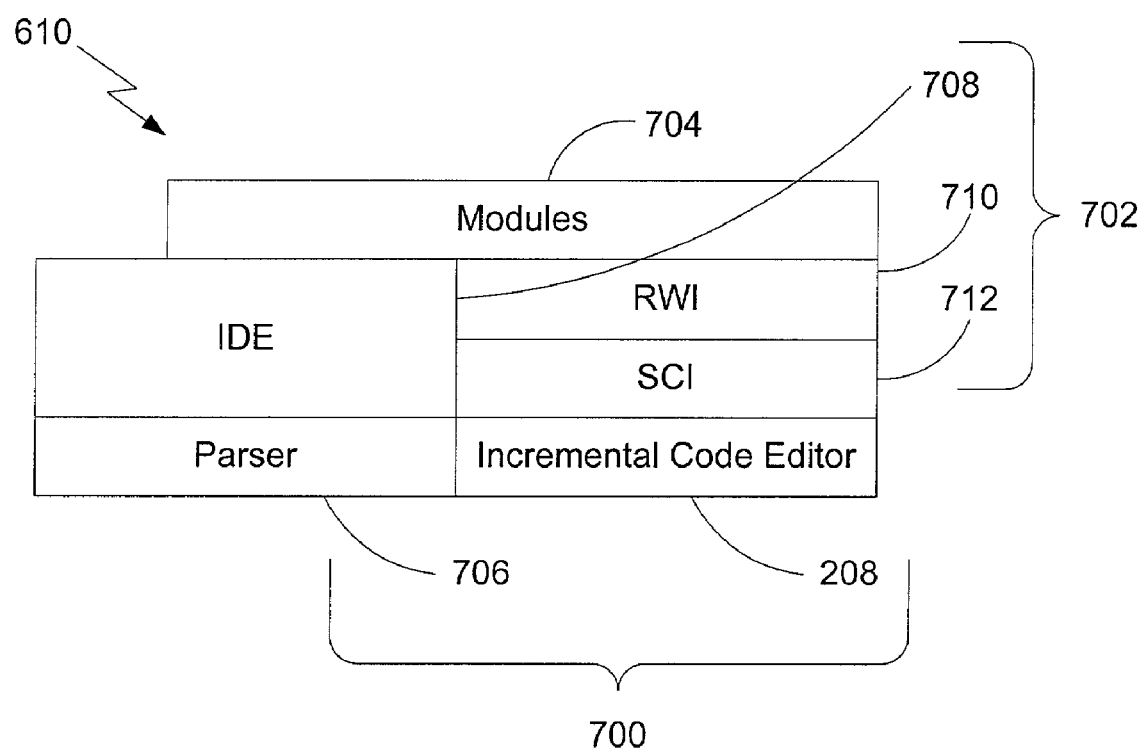
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates the complexity metrics, i.e., the measurement of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
| --- | --- |
| Coupling Between Objects | Represents the number of other classes to which a class is coupled. Counts the number of reference types that are used in attribute declarations, formal parameters, return types, throws declarations and local variables, and types from which attribute and method selections are made.<br>Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
| --- | --- |
| Halstead Difficulty | This measure is one of the Halstead Software Science metrics. It is calculated as ('Number of Unique Operators' / 'Number of Unique Operands') * ('Number of Operands' / 'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |

TABLE 5-continued

Halstead Metrics

| Halstead Metrics | Description |
| --- | --- |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
| --- | --- |
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
| --- | --- |
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
| --- | --- |
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
|---|---|
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
|---|---|
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
|---|---|
| Avoid Hiding Inherited Attributes | Detects when attributes declared in child classes hide inherited attributes. |
| Avoid Hiding Inherited Static Methods | Detects when inherited static operations are hidden by child classes. |
| Command Query | Prevents methods that return a value from a |

TABLE 11-continued

Critical Errors Audits

| Critical Errors Audits | Description |
|---|---|
| Separation | modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass-i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
|---|---|
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize( ) Doesn't Call super.finalize( ) | Calling of super.finalize( ) from finalize( ) is good practice of programming, even if the base class doesn't define the finalize( ) method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
|---|---|
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names-that is not with import of a complete package, using an asterisk. If unused class and interface imports are omitted, the amount of meaningless source code is reduced-thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
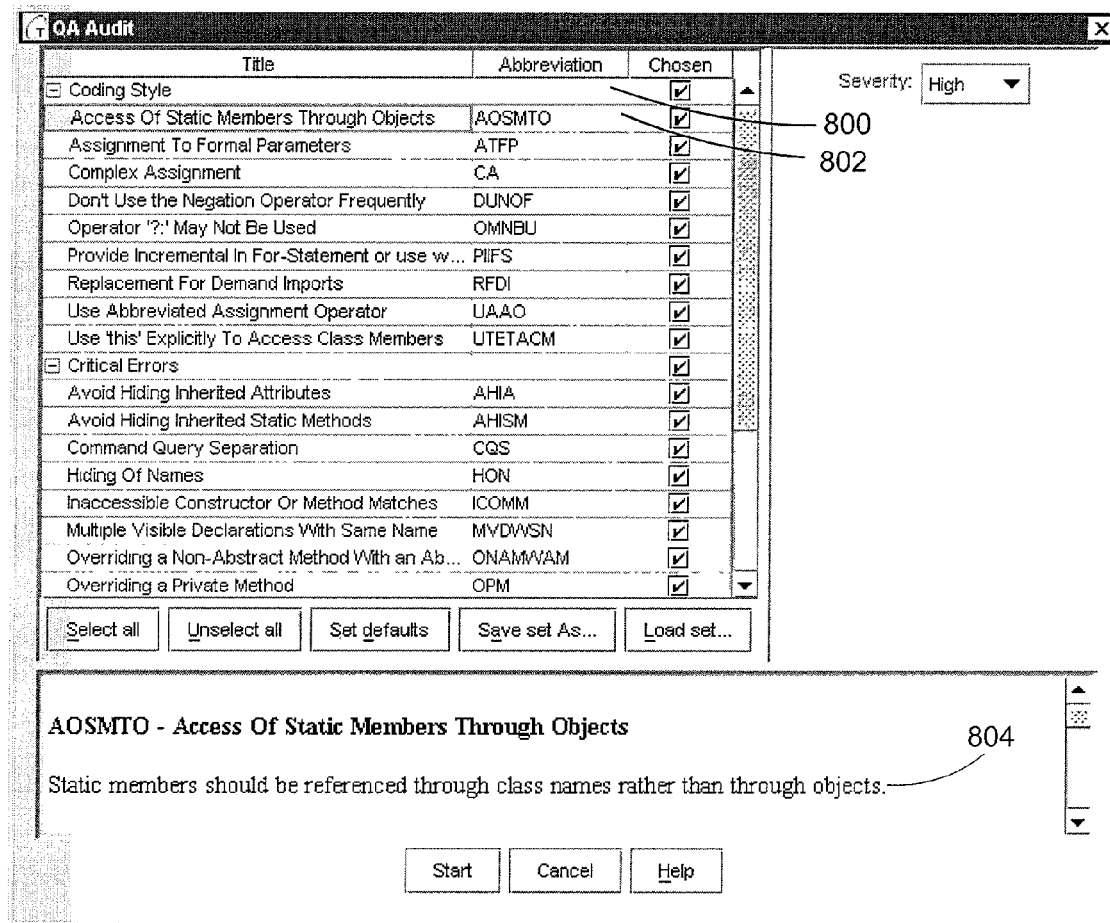
FIG. 8A depicts a user interface displayed by the software development tool depicted in FIG. 2, where the user interface displays a list of predefined criteria which the software development tool checks in the source code.
Figure 8B:
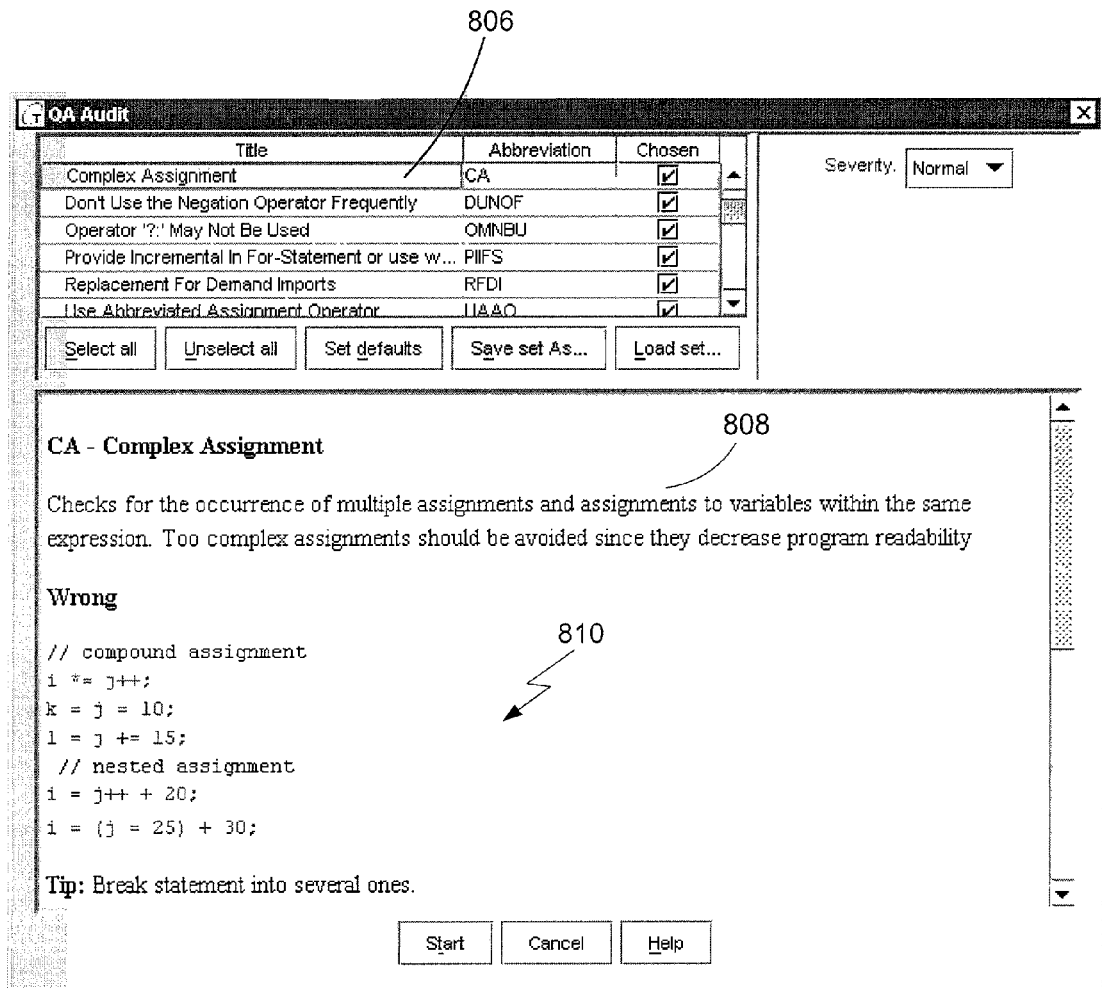
FIG. 8B depicts a user interface displayed by the software development tool depicted in FIG. 2, where the user interface displays the definition of the criteria which the software development tool checks in the source code, and an example of source code which does not conform to the criteria.
Figure 8C:
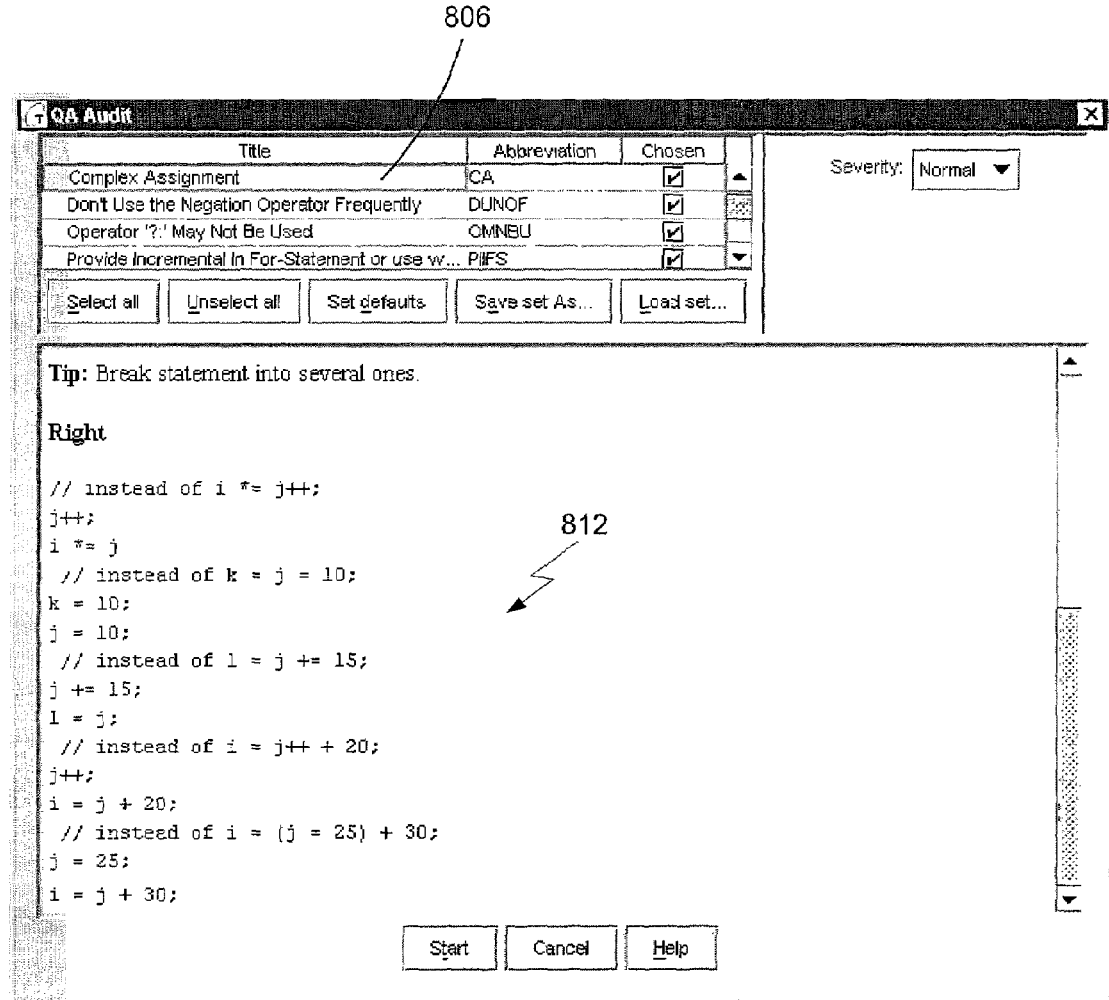
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors well known in the art, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received from the display of the source code, the display of the graphical representation of the project, or via some other independent software to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
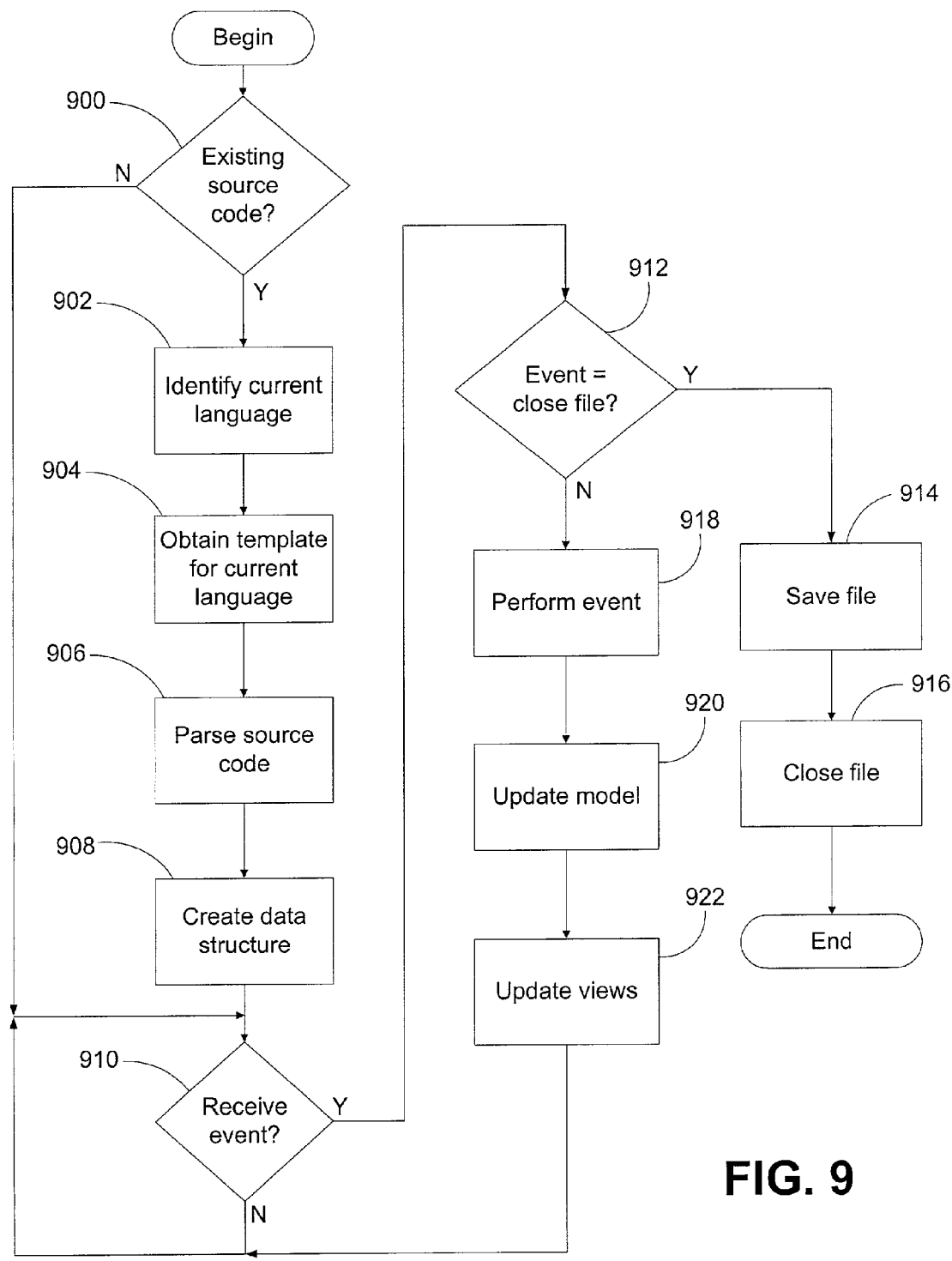
FIG. 9 depicts a flow diagram of the steps performed by the software development tool depicted in FIG. 2.

FIG. 9 depicts a flow diagram of the steps performed by the software development tool to develop a project in accordance with methods and systems consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., ".java" identifies source code written in the Java™ language, while ".cpp" identifies source code written in C++. The software development tool then obtains a template for the current programming language, i.e., a collection of generalized definitions for the particular language that can be used to build the data structure (step 904). For example, the definition of a new Java™ class contains a default name, e.g., "Class1, " and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
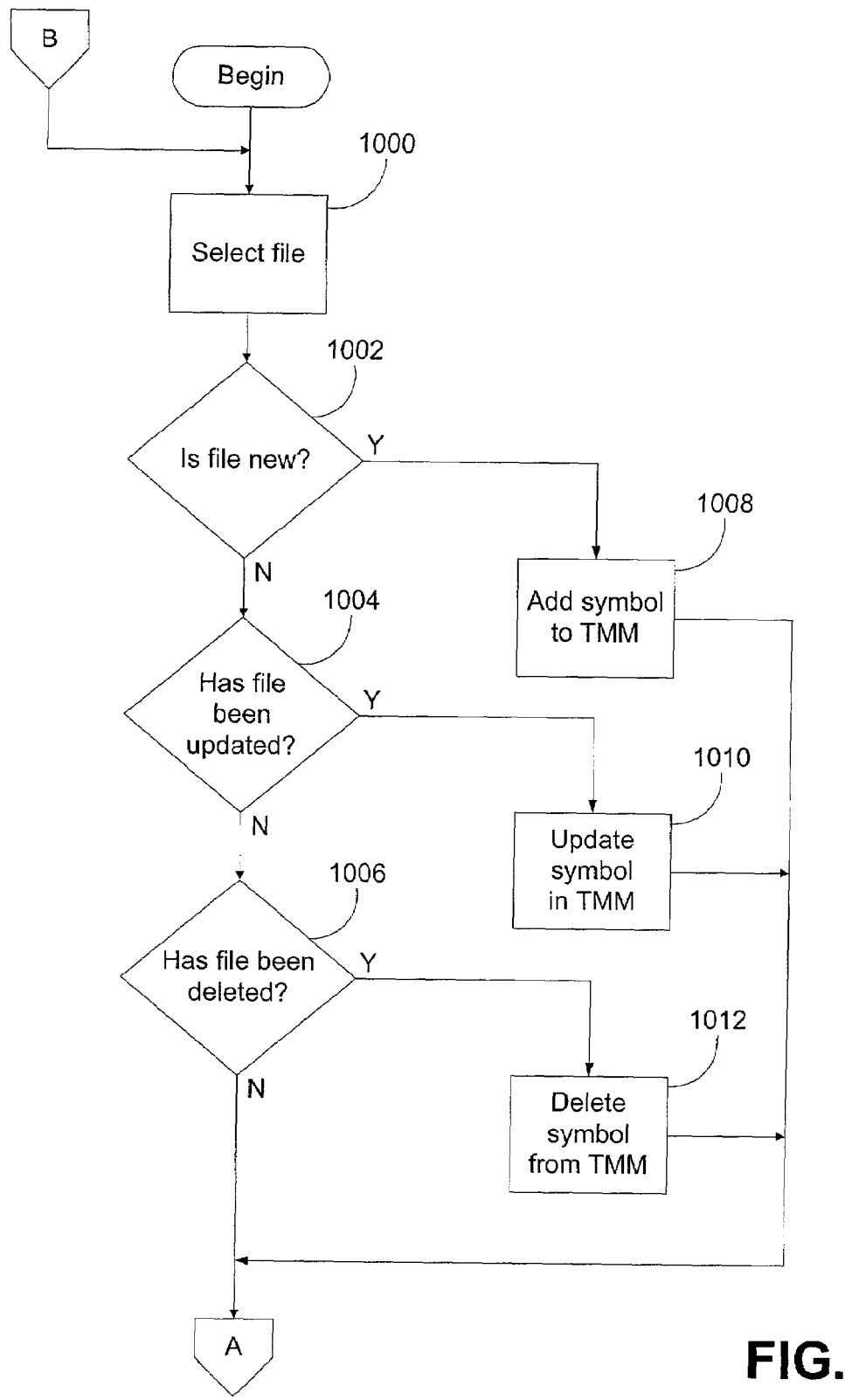
FIGS. 10A and 10B depict a flow diagram illustrating the update model step of FIG. 9.
Figure 10B:
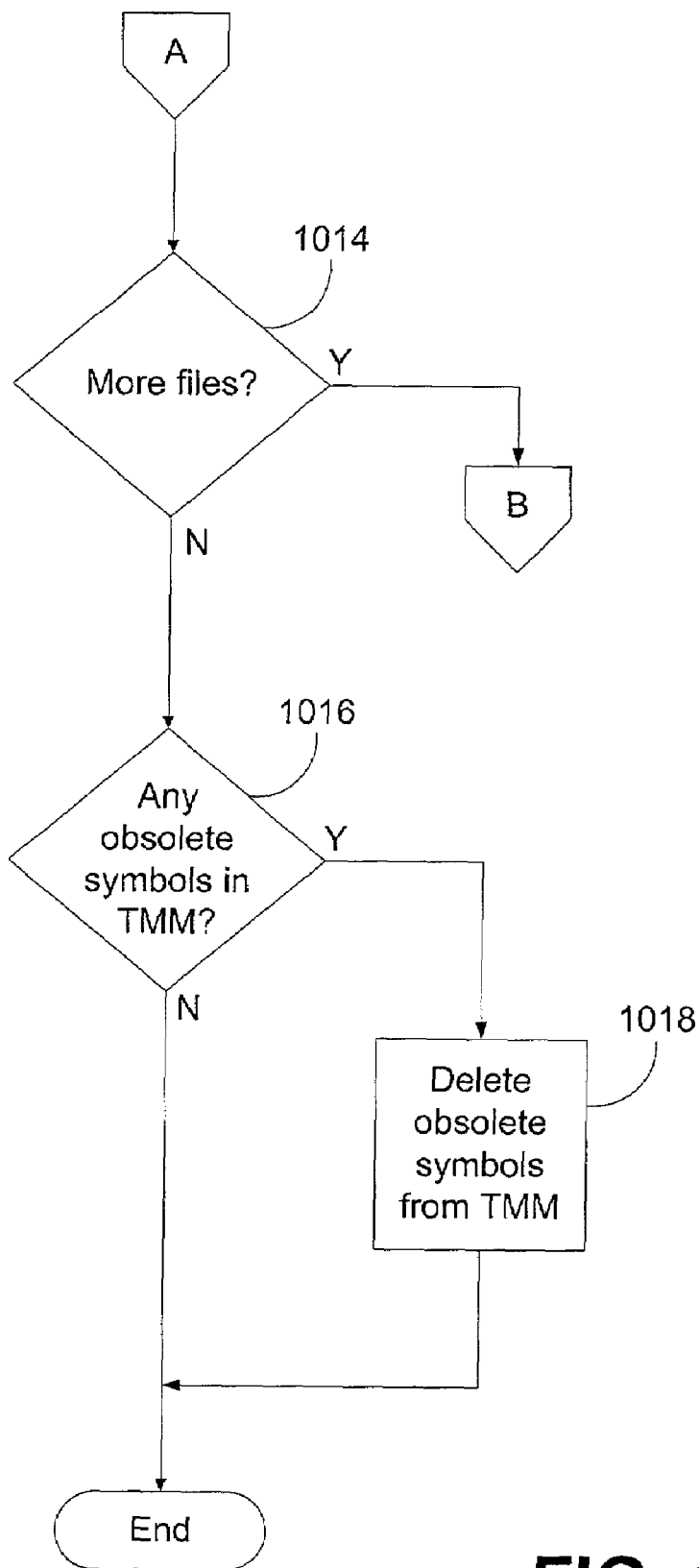

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
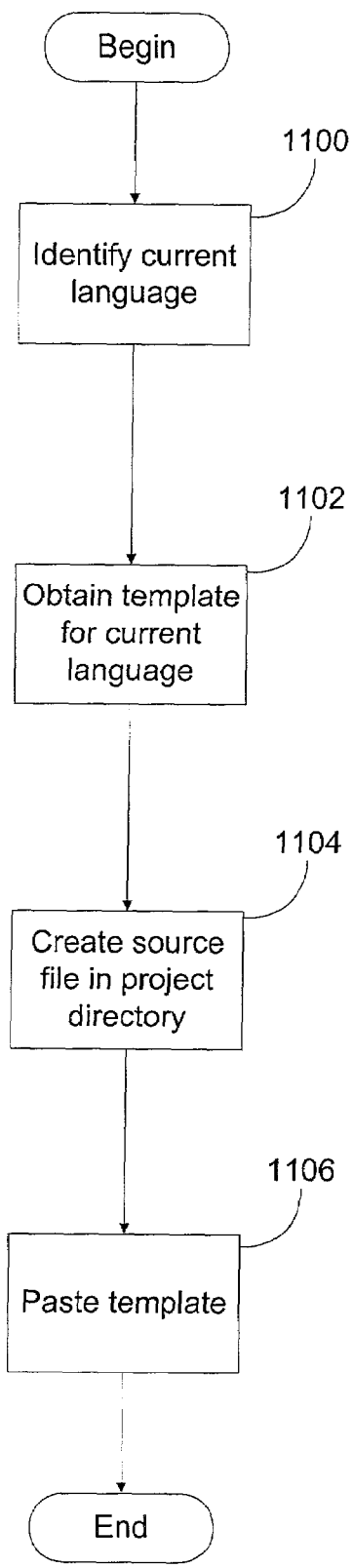
FIG. 11 depicts a flow diagram of the steps performed by the software development tool in FIG. 2 when creating a class.

FIG. 11 depicts a flow diagram illustrating the performance of an event, specifically the creation of a class, in accordance with methods and systems consistent with the present invention. After identifying the programming language (step 1100), the software development tool obtains a template for the language (step 1102), creates a source code file in the project directory (step 1104), and pastes the template onto the TMM (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
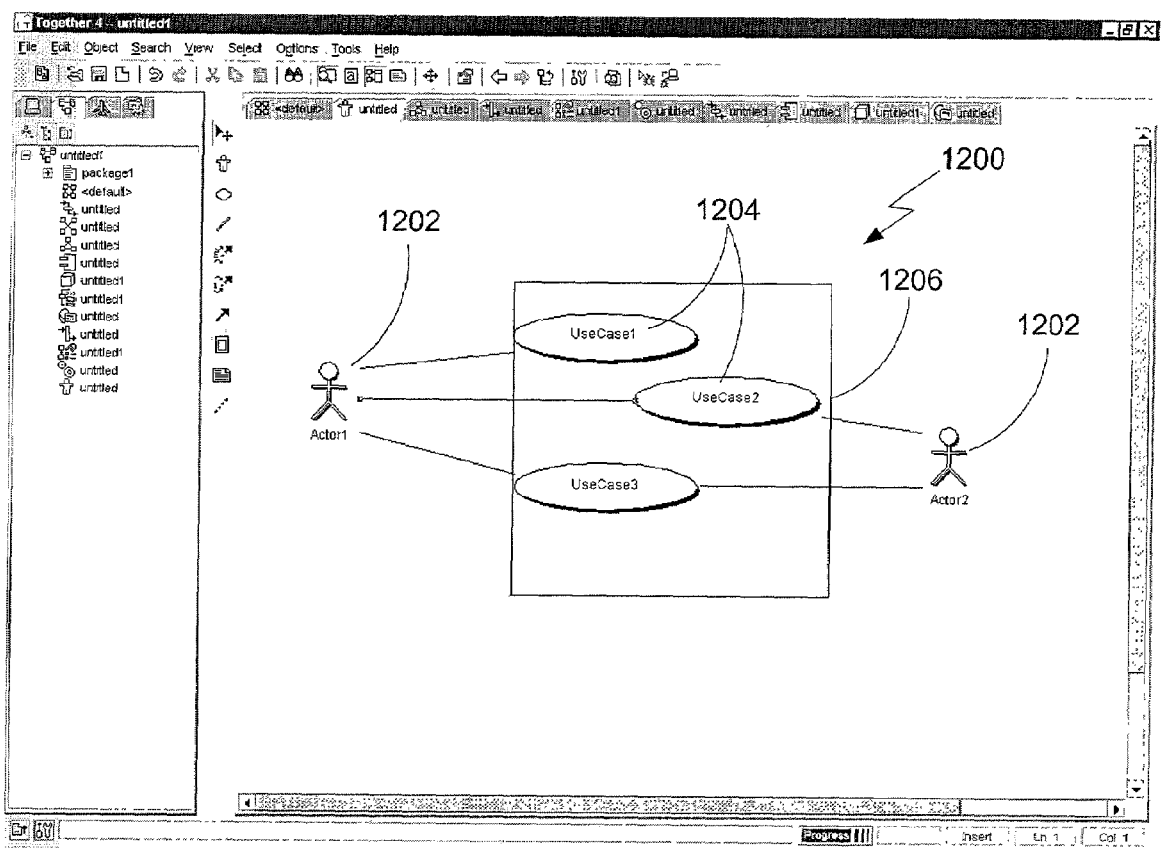
FIG. 12 depicts a user interface displayed by the software development tool depicted in FIG. 2, where the user interface displays a use case diagram of source code.
Figure 13:
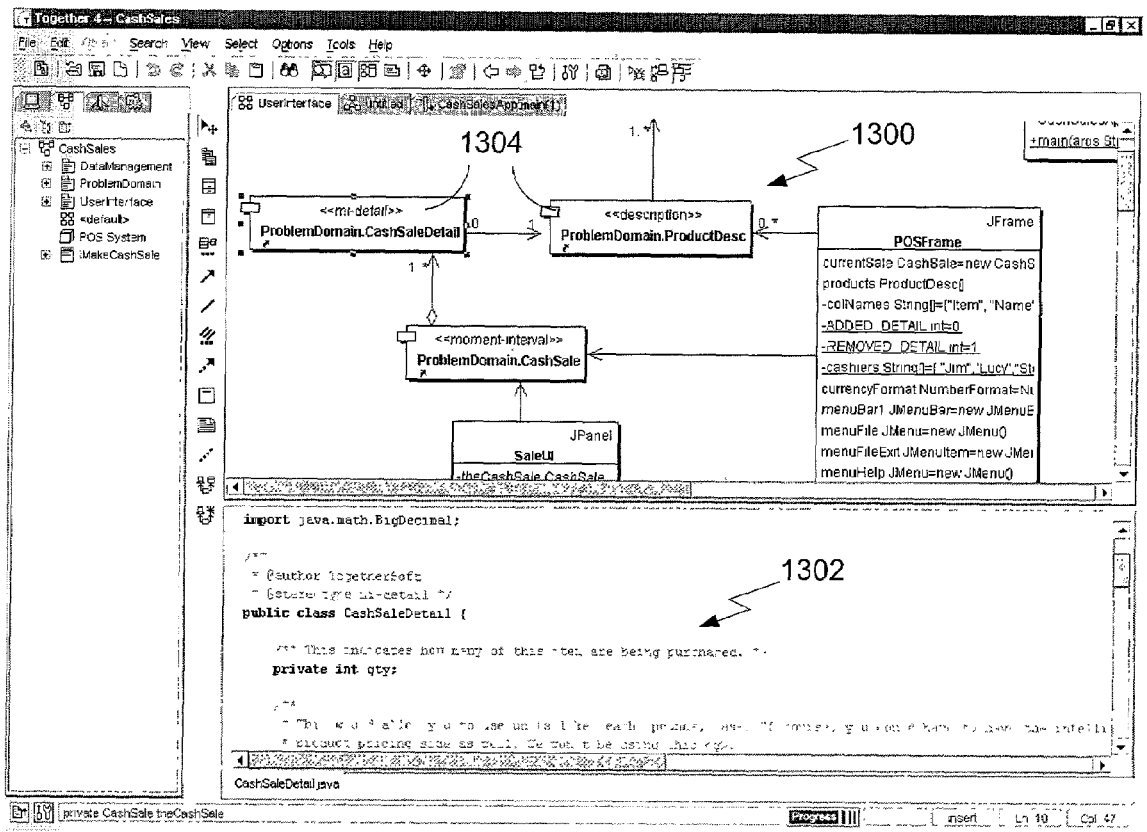
FIG. 13 depicts a user interface displayed by the software development tool depicted in FIG. 2, where the user interface displays both a class diagram and a textual view of source code.

The software development tool is collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
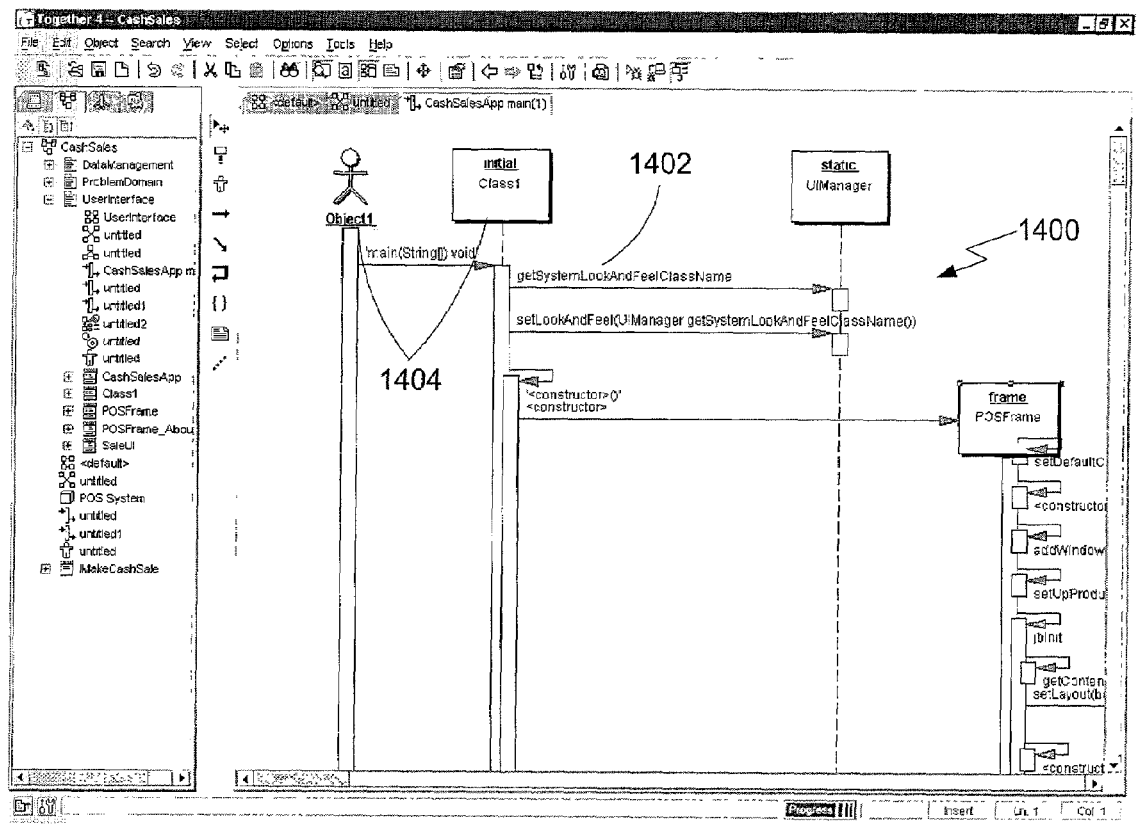
FIG. 14 depicts a user interface displayed by the software development tool depicted in FIG. 2, where the user interface displays a sequence diagram of source code.
Figure 15:
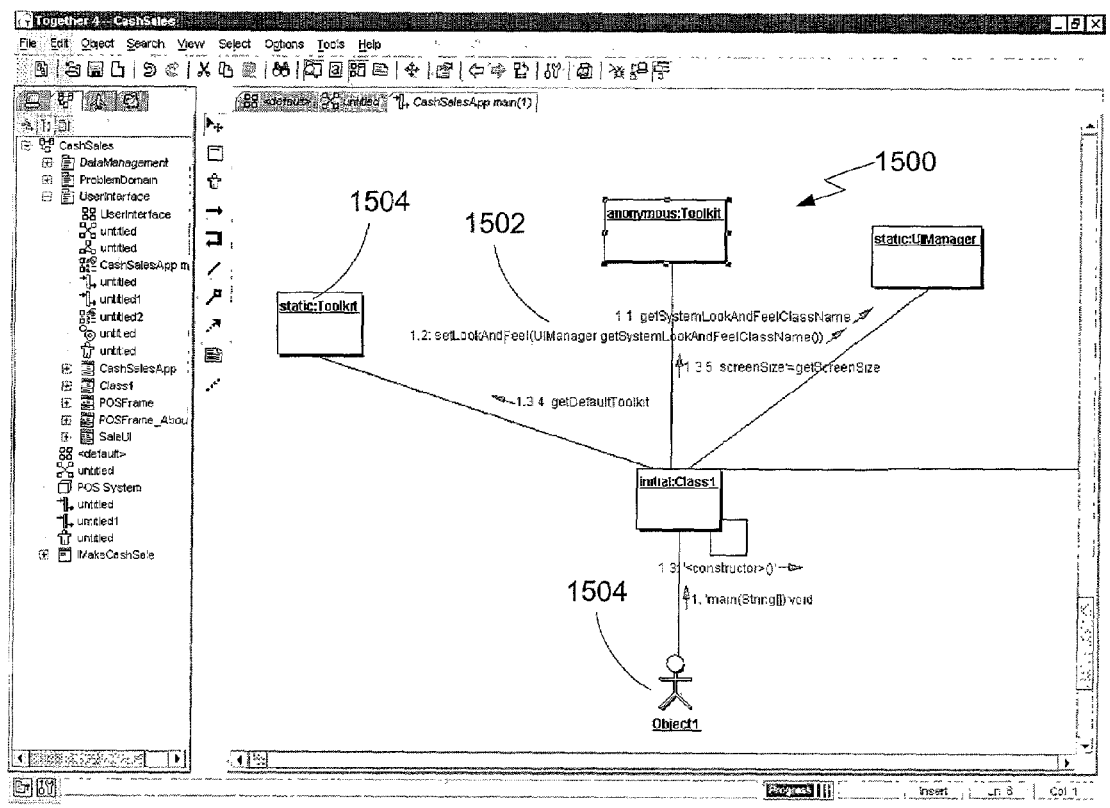
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
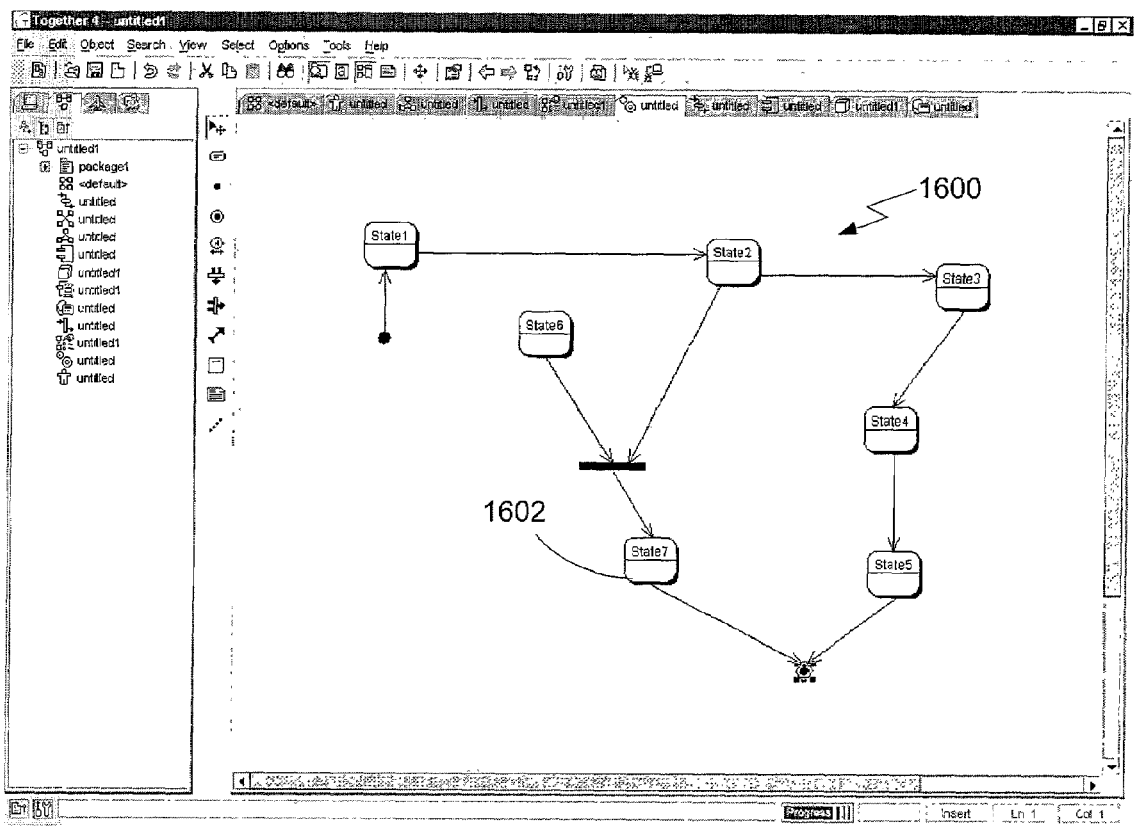
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
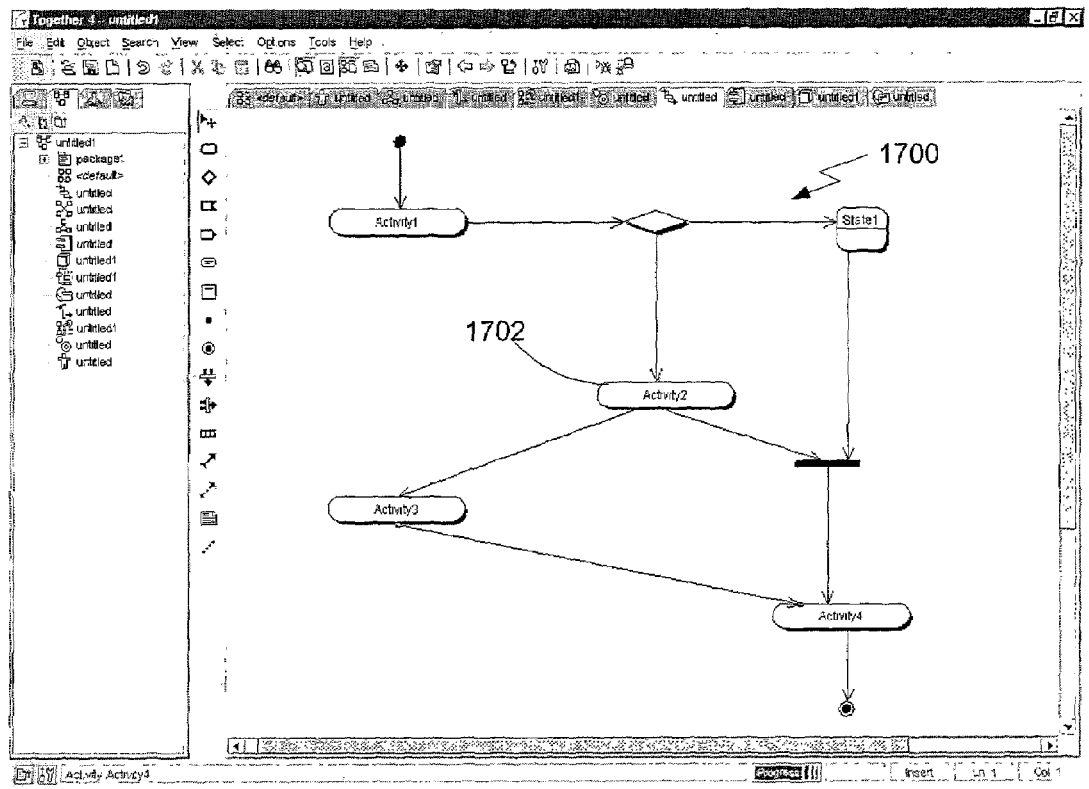
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
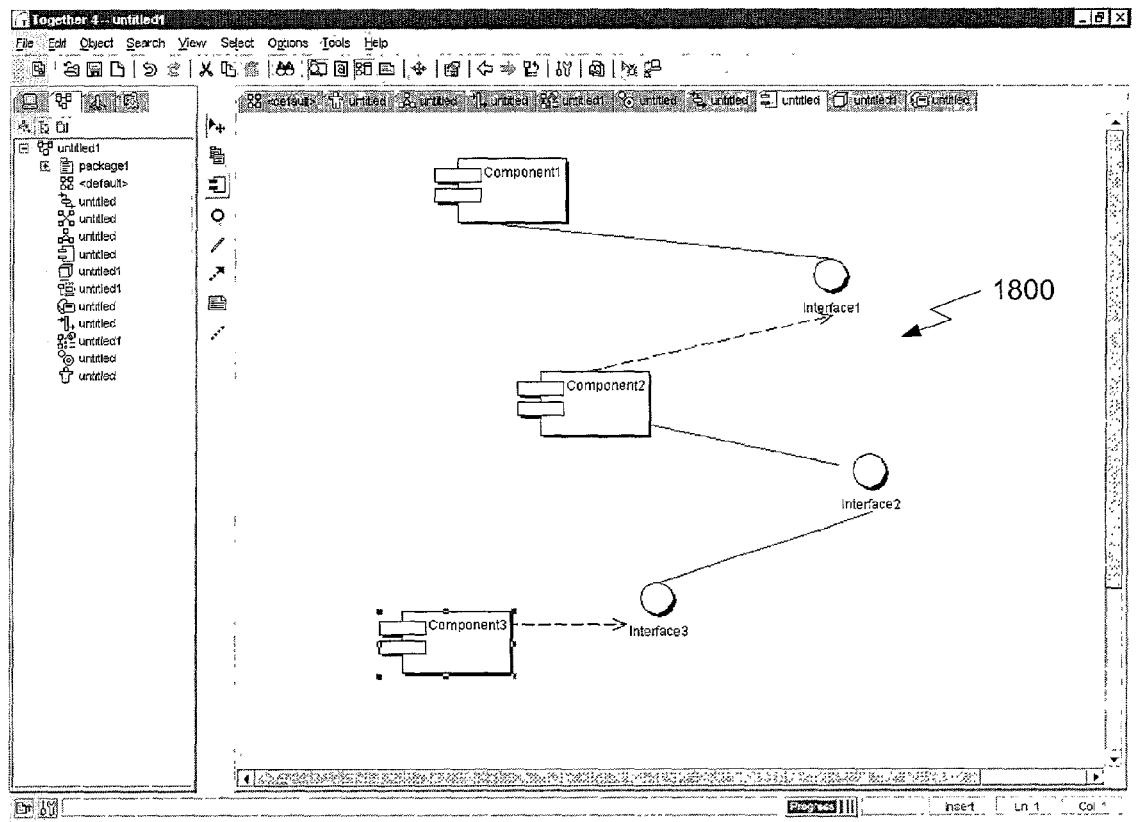
FIG. 18 depicts a user interface displayed by the software development tool depicted in FIG. 2, where the user interface displays a component diagram of source code.
Figure 19:
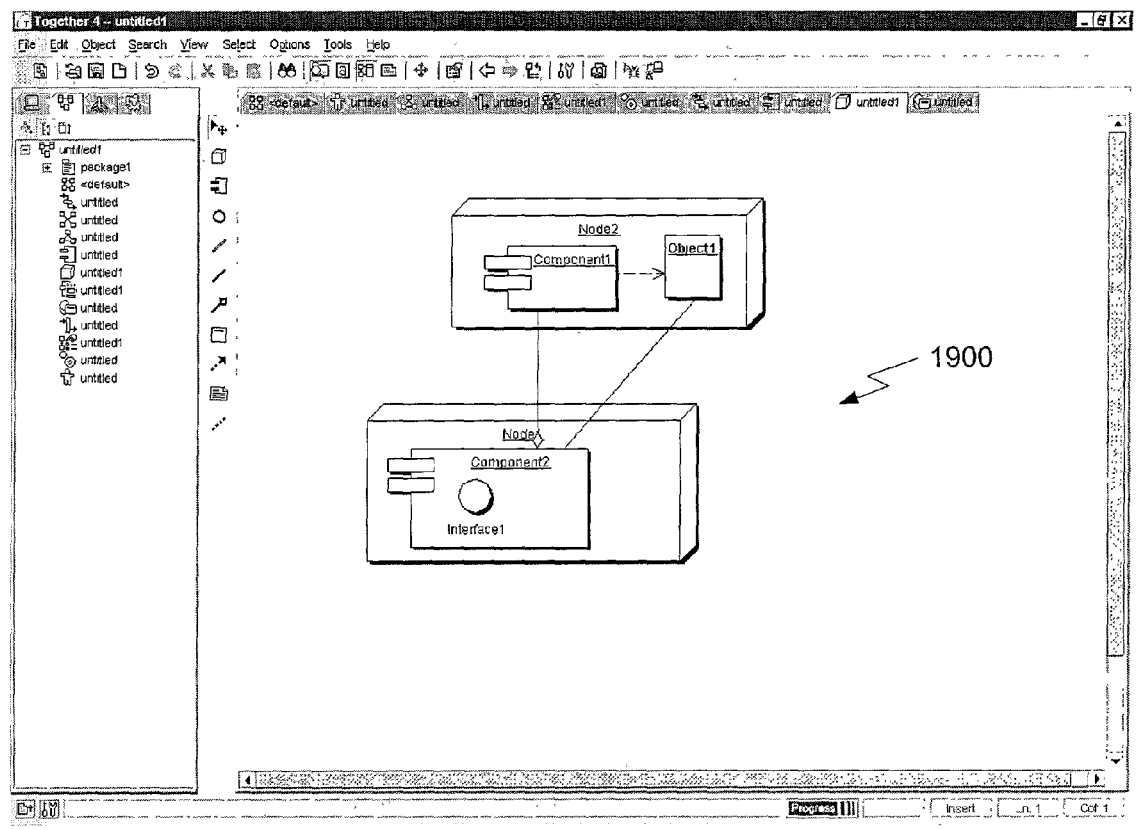
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, Deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Representing Multiple Dependencies Between Nodes with a Single Link

In addition to the functionality described above, the software development tool 610 saves significant programming development time and aids in the production of error free code by providing a developer with a visual cue of multiple dependencies between two nodes in a project via a single dependency link between the nodes. Each node in the project may be a package, a class, or an interface. If the node is a package, the classes and/or interfaces within the package are referred to as the "elements" in the node. If the node is a class or an interface, the class or the interface is the "element" in the node. A dependency exists between the two nodes if changes to a defining element, i.e., a class or an interface in one node, may impact a dependent element, i.e., a class or an interface in another node. The node containing the defining element is referred to as the "defining node," and the node containing the dependent element is referred to as the "dependent node." Changes to the defining element may impact the dependent element because the dependent element uses the defining element, such as in a declaration, a local variable definition, a method invocation, or a constructor (i.e., a special type of method invocation that initializes every data field when a new object is created from a class). For example, as shown in FIG. 20, class "Sale" 2002 uses the class "Product" 2004 by declaring "aProd" 2006 (an argument parameter for the method "addItem" 2008) to be of the type "Product," resulting in one dependency. In addition, the class "Sale" 2002 uses the class "Product" 2010 in a method invocation "Product.lookup (barCode)" 2012, resulting in a second dependency. Conventional tools display the two dependencies separately. In accordance with methods and systems consistent with the present invention, the software development tool 610 allows a developer to display the two dependencies between the class "sale" 2002 and the class "product" 2004 as a single dependency link. By displaying multiple dependencies as a single dependency link and allowing the developer to selectively choose to identify the multiple dependencies reflected by the single dependency link, the software development tool visually apprises the developer of which nodes may be impacted by a code change without displaying a spider web of dependencies between the two nodes. In another embodiment, the software development tool may alter the appearance of the link depending on the number of dependencies between the nodes. For example, the thickness of the link may be proportional to the number of dependencies between the nodes, or the color of the link may change depending on the number of dependencies between the nodes.

Figure 21:
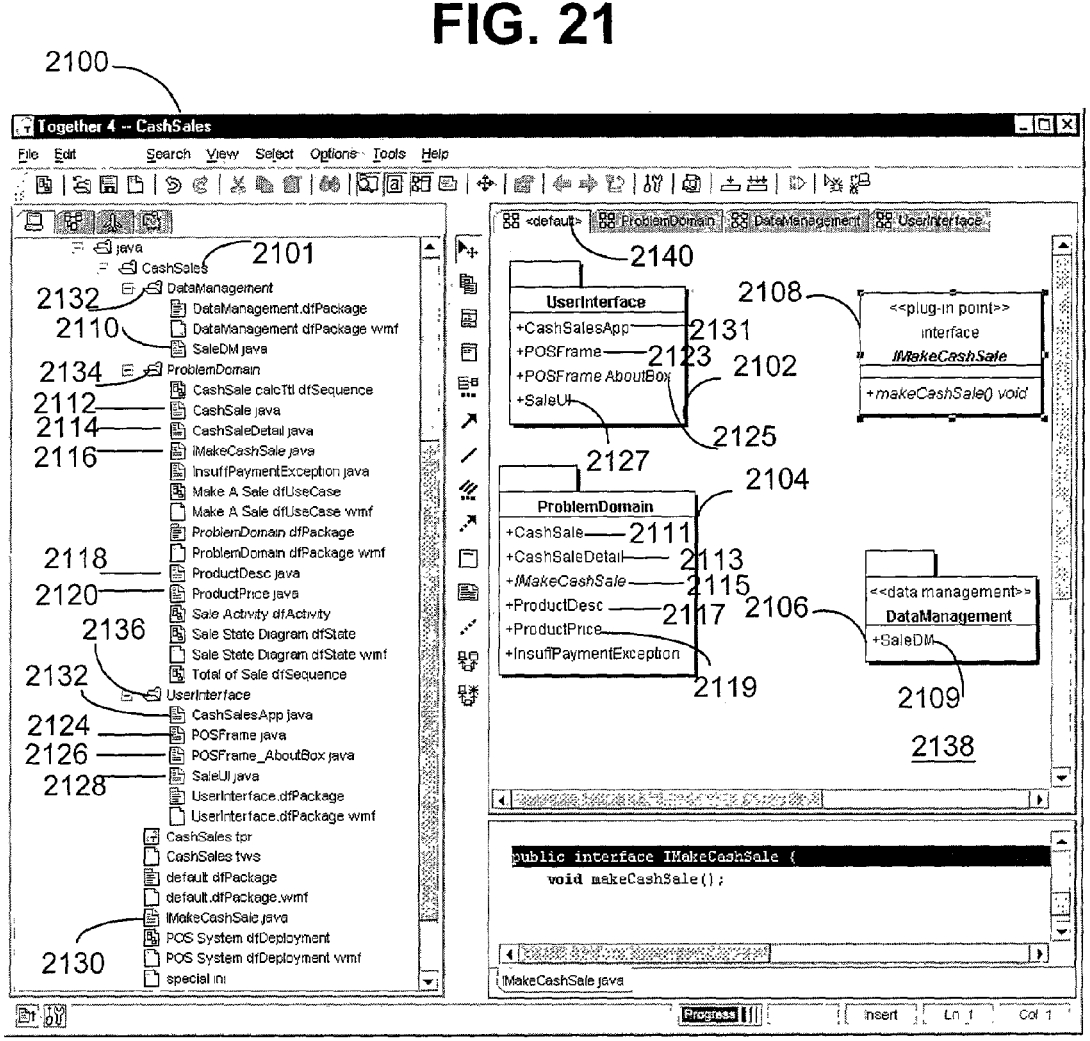
FIG. 21 depicts an exemplary user interface displayed by the software development tool in response to a request to open a project containing a group of object-oriented elements, where the exemplary user interface shows a group of nodes that graphically represent the group of object-oriented elements in the project.

FIG. 21 depicts an exemplary user interface 2100 displayed by the software development tool in response to a request to open a project containing a group of object-oriented elements. Each object-oriented element may be a class or an interface. The exemplary user interface 2100 shows a group of nodes 2102, 2104, 2106, and 2108 that graphically represent the group of object-oriented elements in the project. As discussed above, a node may be a graphical representation of a package, a class, or an interface. As shown in FIG. 21, the software development tool displays a group of packages (depicted graphically as 2102, 2104, and 2106) and an interface (depicted graphically as 2108) as nodes in the project "CashSales" 2101. Each package 2102, 2104, and 2106 represents a directory 2136, 2134, and 2132 that contains a portion of the object-oriented elements in the project. Each object-oriented element in the project has corresponding code stored in a respective file within the project. For example, in FIG. 21, class "SaleDM" 2109 in package "DataManagement" 2106 has corresponding code stored in file "SaleDM.java" 2110. Similarly, in package "ProblemDomain" 2104, class "CashSale" 2111, class "CashSaleDetail" 2113, interface "IMakeCashSale" 2115, class "ProductDesc" 2117, and class "ProductPrice" 2119 have corresponding code stored in files "CashSale.java" 2112, "CashSaleDetail.java" 2114, "IMakeCashSale.java" 2116, "ProductDesc.java" 2118, and "ProductPrice.java" 2120, respectively. Also in package "UserInterface" 2102, class "CashSalesApp" 2131, class "POSFrame" 2123, class "POSFrame AboutBox" 2125, and class "SaleUI" 2127 have corresponding code stored in files "CashSalesApp.java" 2132, "POSFrame.java" 2124, "POSFrame_AboutBox.java" 2126, and "SaleUI.java" 2128, respectively.

According to methods and systems consistent with the present invention, when a developer prompts the software development tool to open the project "CashSales" 2101, the software development tool parses code corresponding to each object-oriented element (i.e., a class or an interface having corresponding code) in each package into a respective data structure 300 of TMM 200 as discussed previously. The software development tool then generates the graphical representation of the code corresponding to each element in TMM 200 on the graphical pane 2138. In one implementation, when viewing the root directory of the project, such as indicated by "default" tab 2140, the software development tool displays a graphical representation of each package 2102, 2104, and 2106 as a node. Each node includes an indication of the object-oriented elements contained in each respective package. The graphical representation of the code corresponding to each element, however, is hidden from view in order to provide a developer with a more abstract perspective view of the project. For example, UserInterface package 2102 includes an indication of class CashSalesApp 2131, however the graphical representation of the code corresponding to CashSalesApp is hidden from view.

Figure 22A:
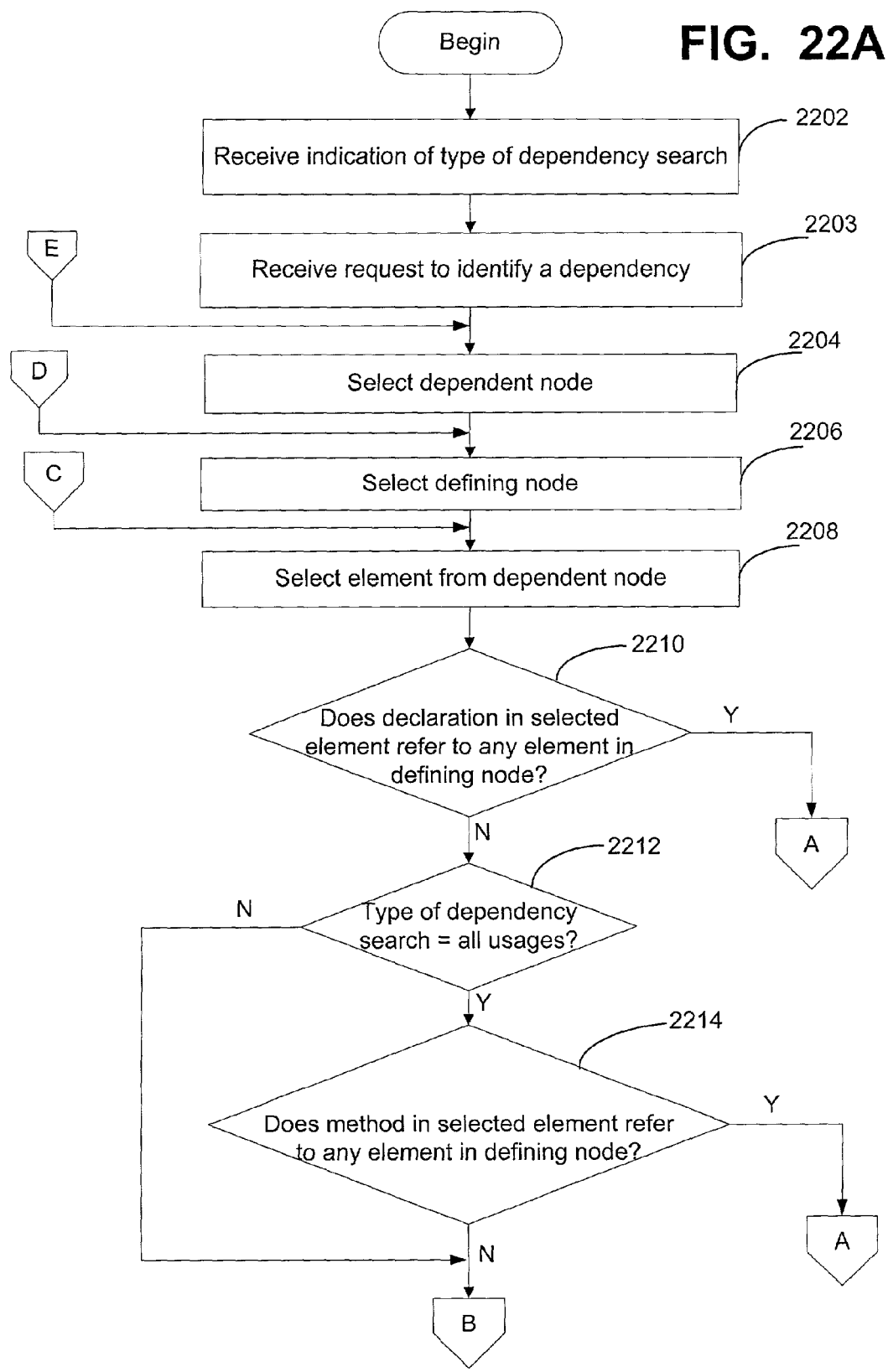
FIGS. 22A and 22B depict a flow diagram illustrating an exemplary process performed by the software development tool in FIG. 2 to identify one or more dependencies between two nodes in a project.
Figure 22B:
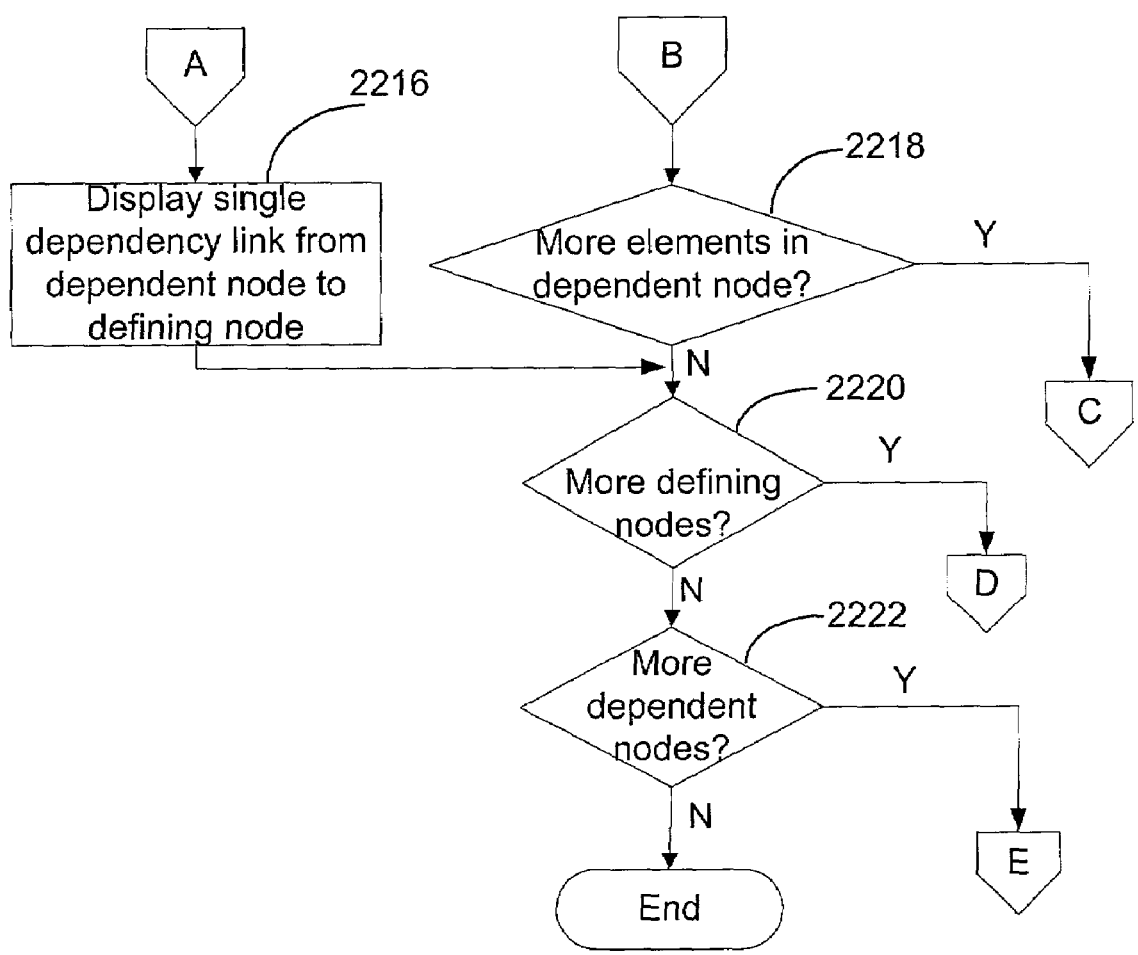
Figure 23:
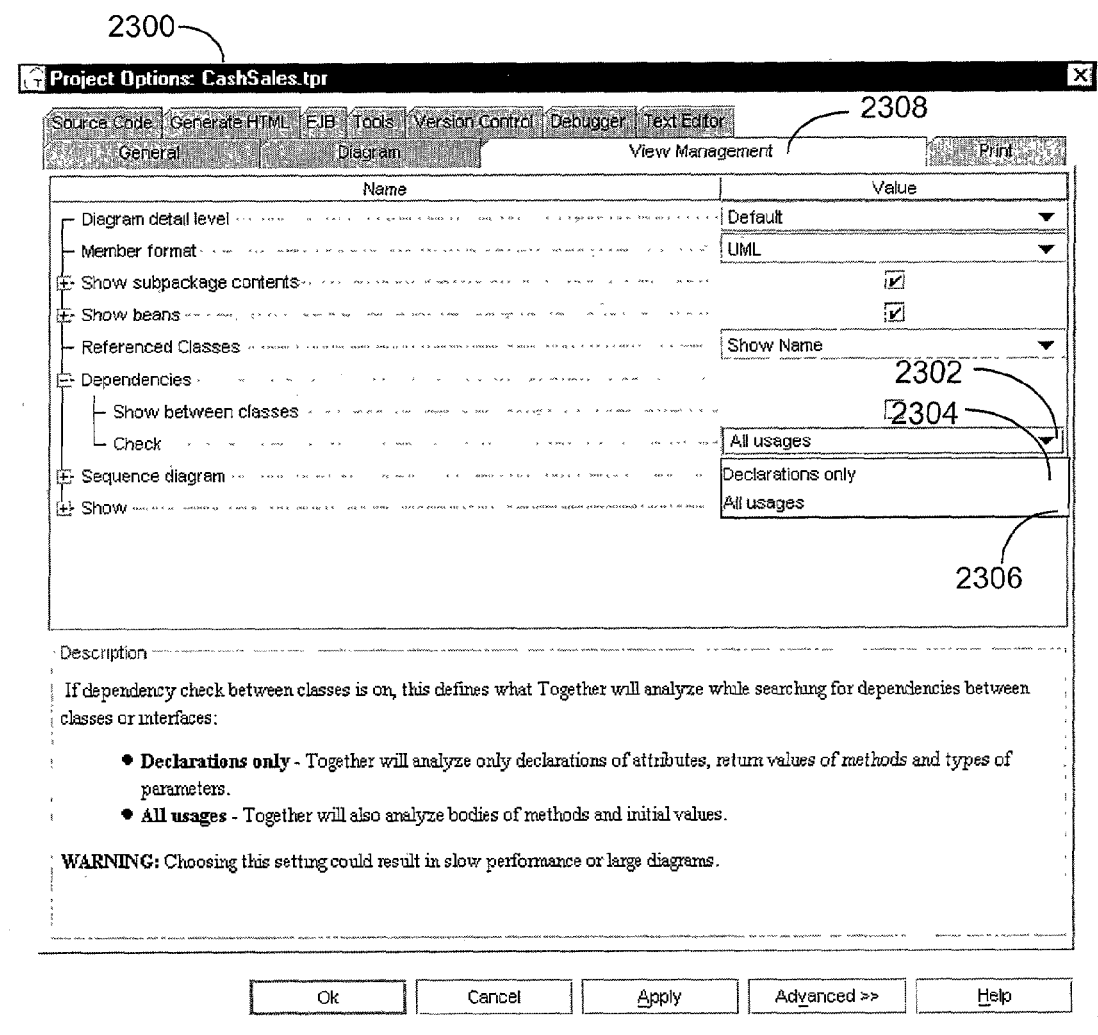
FIG. 23 depicts an exemplary user interface displayed by the software development tool depicted in FIG. 2, where the user interface displays a list of dependency search types that the software development tool may perform.

FIGS. 22A and 22B depict a flow diagram illustrating an exemplary process performed by the software development tool to graphically represent multiple dependencies between two nodes in a project as a single dependency link. The steps are performed after the source code has been parsed and the graphical representation of the object-oriented elements in the source code has been displayed. Initially, the software development tool receives an indication of a type of dependency search (step 2202). In one implementation shown in FIG. 23, the software development tool receives the indication of the type of dependency search from a pull down menu selection 2302. Although the software development tool is depicted with a pull-down menu 2302, other known input techniques, such as a keyboard input or an icon selection, may also be used to convey the indication of the type of dependency search to the software development tool. In the implementation shown in FIG. 23, the type of declaration search is "declarations only" 2304 or "all usages"

2306. If the type of dependency search is "declarations only" 2304, the software development tool searches the element(s) in the dependent node for a declaration, a return value of methods, or an argument parameter for a reference to an element in the defining node. If the developer chooses "all usages" 2306 as the type of dependency search, the software development tool will also analyze the element(s) in the dependent node for a use of the defining element. Thus, the software development tool allows the developer to obtain a broad perspective of dependencies between nodes by limiting the analysis to "declarations only" 2304. However, the software development tool allows the developer to view all sources of dependencies to take corrective measures in the design of the code or determine potential impact to a change in the code by expanding the analysis performed by the software development tool to "all usages" 2306.

Figure 24:
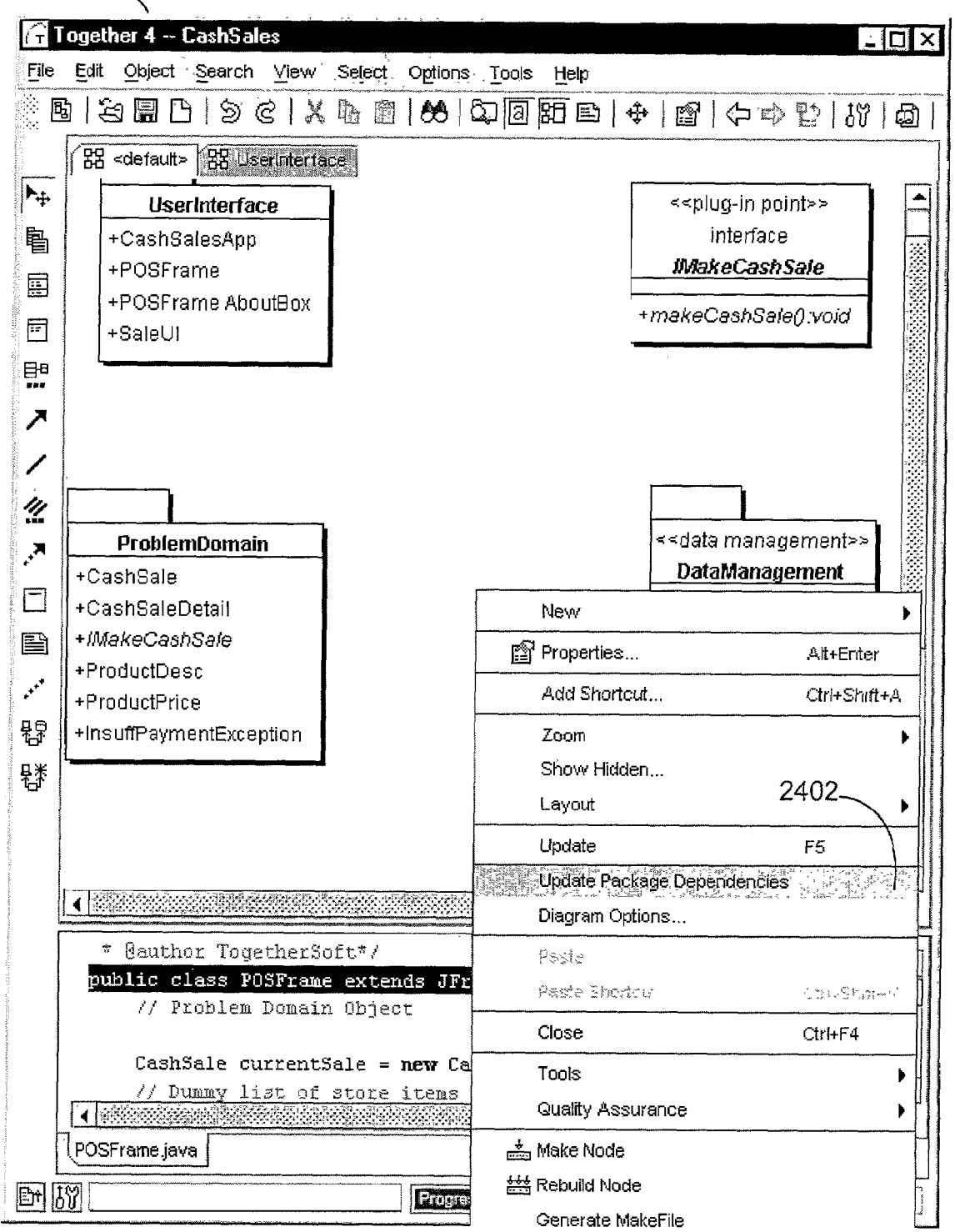
FIG. 24 depicts an exemplary user interface displayed by the software development tool depicted in FIG. 2 for requesting the software development tool to identify a dependency between packages.

After receiving an indication of the type of dependency search, the software development tool receives a request to identify a dependency (step 2203). As shown in the exemplary user interface 2400 depicted in FIG. 24, the software development tool may receive the request 2402 to identify a dependency via the developer making a selection from a pull down menu. However, any known data input technique, such as a keyboard input or an icon selection, may be used to convey the same information to the software development tool.

The next step performed by the software development tool is to select a dependent node (step 2204). The software development tool also selects a defining node (step 2206). The software development tool then selects an element from the dependent node (step 2208). After selecting the element from the dependent node, the software development tool determines whether a declaration in the selected element refers to any element in the defining node, also known as the defining element (step 2210). As previously noted, a node may be a package, class, or interface that is graphically represented by the software development tool. For example, in FIG. 21, the software development tool displays nodes 2102, 2104, 2106, and 2108 in the project "CashSales" 2101, which graphically represent packages "UserInterface" 2136, "ProblemDomain" 2134, and "DataManagement" 2132 as well as interface "IMakeCashSale" 2130, respectively. To determine whether a declaration in the code corresponding to the selected element refers to any defining element, the software development tool searches the source code of the selected element by invoking the TMM 200 to provide a declaration associated with the defining element. In another implementation, the software development tool may scan the file associated with the selected element to find a declaration in the code corresponding to the defining element. For example, in FIG. 25, if class "POSFrame" 2512 in node 2102 (i.e., package "UserInterface") is the selected element, the software development tool searches the source code of class "POSFrame" 2502 to find the declaration "CashSale currentSale" 2504. The declaration 2504 refers to a defining element, "CashSale" 2506, that is in a different node, "ProblemDomain" 2104, i.e., the defining node.

If no declaration in the selected element refers to any element in the defining node, the software development tool determines whether the type of dependency search is "all usages" (step 2212). If the developer chose to search "all usages," the software development tool determines whether a method in the selected element in the dependent node refers to any element in the defining node (step 2214). Thus, the software development tool determines whether the developer has requested a more extensive analysis. To determine whether a method in the selected element refers to an element in the defining node, the software development tool searches the source code of the selected element by invoking the TMM 200 to provide a method associated with the selected element. In another implementation, the software development tool scans the file associated with the selected element for a method header construct that includes an access specifier, a return type, a method name, and an argument field between parenthesis. For example, if the software development tool is searching the class "POSFrame" 2502 as the selected element, the software development tool will find the method header "private void setUpProducts( )" (not shown in FIG. 25) which identifies a method in code corresponding to class "POSFrame" 2502. In this implementation, the software development tool then searches the method body, i.e., the code that is in brackets "{ }" following the method header, to identify if the second class is used in a local variable definition, method invocation, or a constructor. As discussed above, a constructor is a special type of method invocation for initializing data fields in a newly created object of a class. For example, the constructor "new ProductDesc[10]" (not shown in FIG. 25) creates and initializes an object of the defining element, "ProductDesc" (graphically depicted as 2526) in the defining node, "ProblemDomain" 2104. Thus, in this instance, the software development tool would identify a dependency as the method in the class "POSFrame" 2512 in the node "UserInterface" 2102 using the class "ProductDesc" 2526 in the node "ProblemDomain" 2104. In the event that the type of dependency search is not "all usages," the software development would not perform step 2214, thus limiting the search to declarations in the selected element that refer to an element in the defining node.

Figure 25:
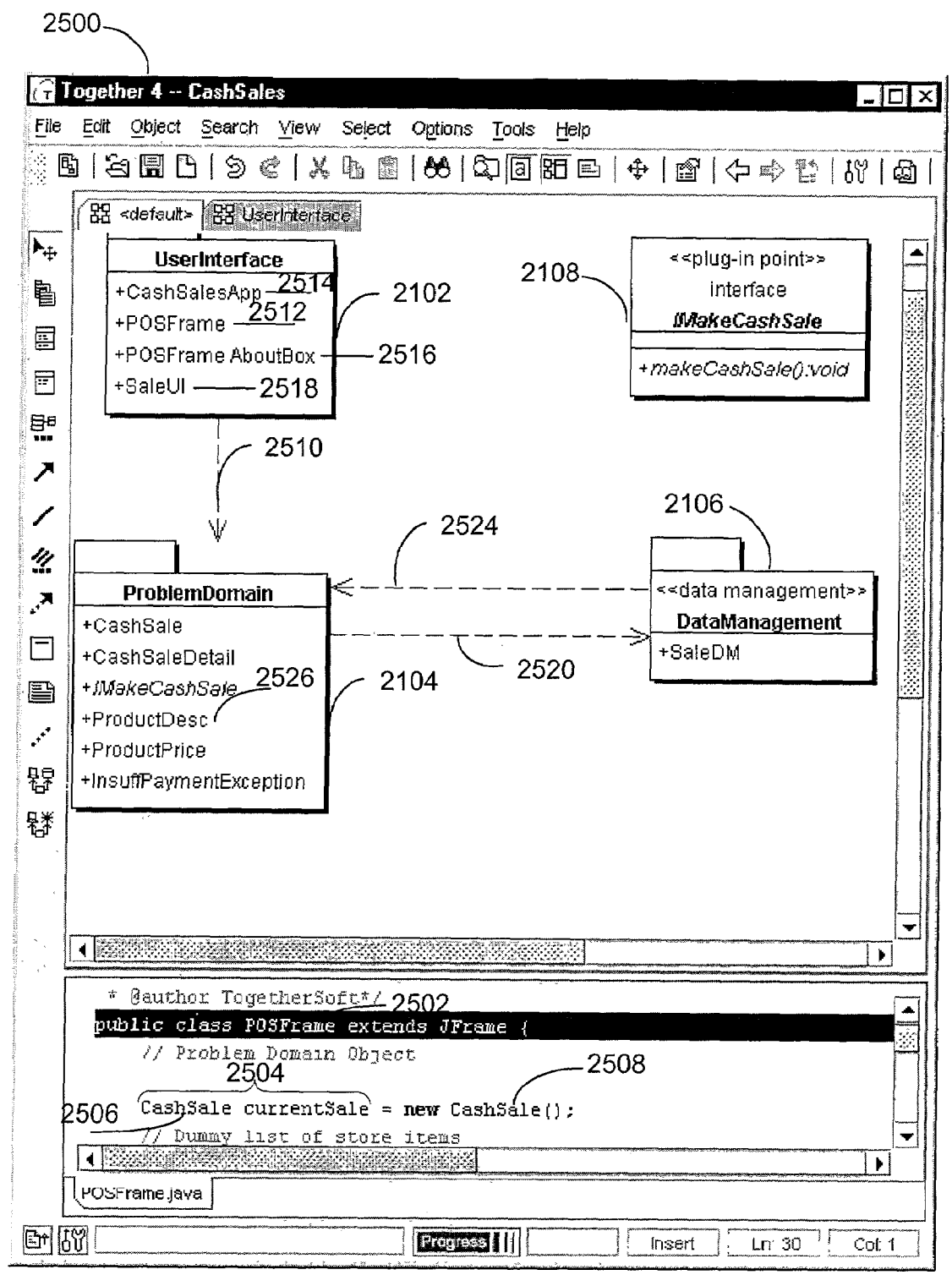
FIG. 25 depicts an exemplary screen showing a single dependency link between two packages displayed by the software development tool in FIG. 2 to reflect at least one dependency identified in code corresponding to a class in one of the two packages.

If no method in the selected element refers to any element in the defining node, or if the type of dependency search is not "all usages," the software development tool determines whether there are more elements in the dependent node (step 2218 in FIG. 22B). If there are more elements, processing continues with the next element at step 2208. For example, as shown in FIG. 25, if the software development tool completed its analysis of the code corresponding to "POSFrame" 2512 as the selected element, the software development tool recognizes that the associated dependent node, "User Interface" 2102, has three other elements "CashSalesApp" 2514, "POSFrame AboutBox" 2516 and "SaleUI" 2518. Thus, the software development tool will proceed to check the next element associated with the dependent node, "User Interface" 2102, when it is determined that each element in the dependent node has not been checked. Moreover, since the software development tool draws one dependent link regardless of how many dependencies exist between two nodes, the software development tool need not check all elements in each node. Once a dependency is found, the software development tool may proceed to the next node.

If all elements in the dependent node have been analyzed, the software development tool determines whether there are any more defining nodes (step 2220). If there are more defining nodes, processing continues with the next defining node at step 2206. If all defining nodes have been analyzed, the software development tool determines whether there are any more dependent nodes (step 2222). If there are more dependent nodes, processing continues with the next dependent node at step 2204. If all dependent nodes have been analyzed, processing ends. If at step 2210 or 2214, the software development tool determines that a dependency exists between the dependent node and the defining node, the software development tool displays a single dependency link from the dependent node to the defining node (step 2216). Processing then continues at step 2220. For example, as shown in FIG. 25, the software development tool displays the dependency link 2510 in response to identifying that the class "POSFrame" 2512 in the dependent node "UserInterface" 2102 refers to the class "ProductDesc" 2526 in the defining node, "ProblemDomain" 2104. The dependency link 2510 is displayed as a broken arrow pointing from the dependent node 2102 to the defining node 2104 to visually signify that the package "UserInterface" has a dependent element that uses a defining element contained in the package "ProblemDomain."

Figure 26:
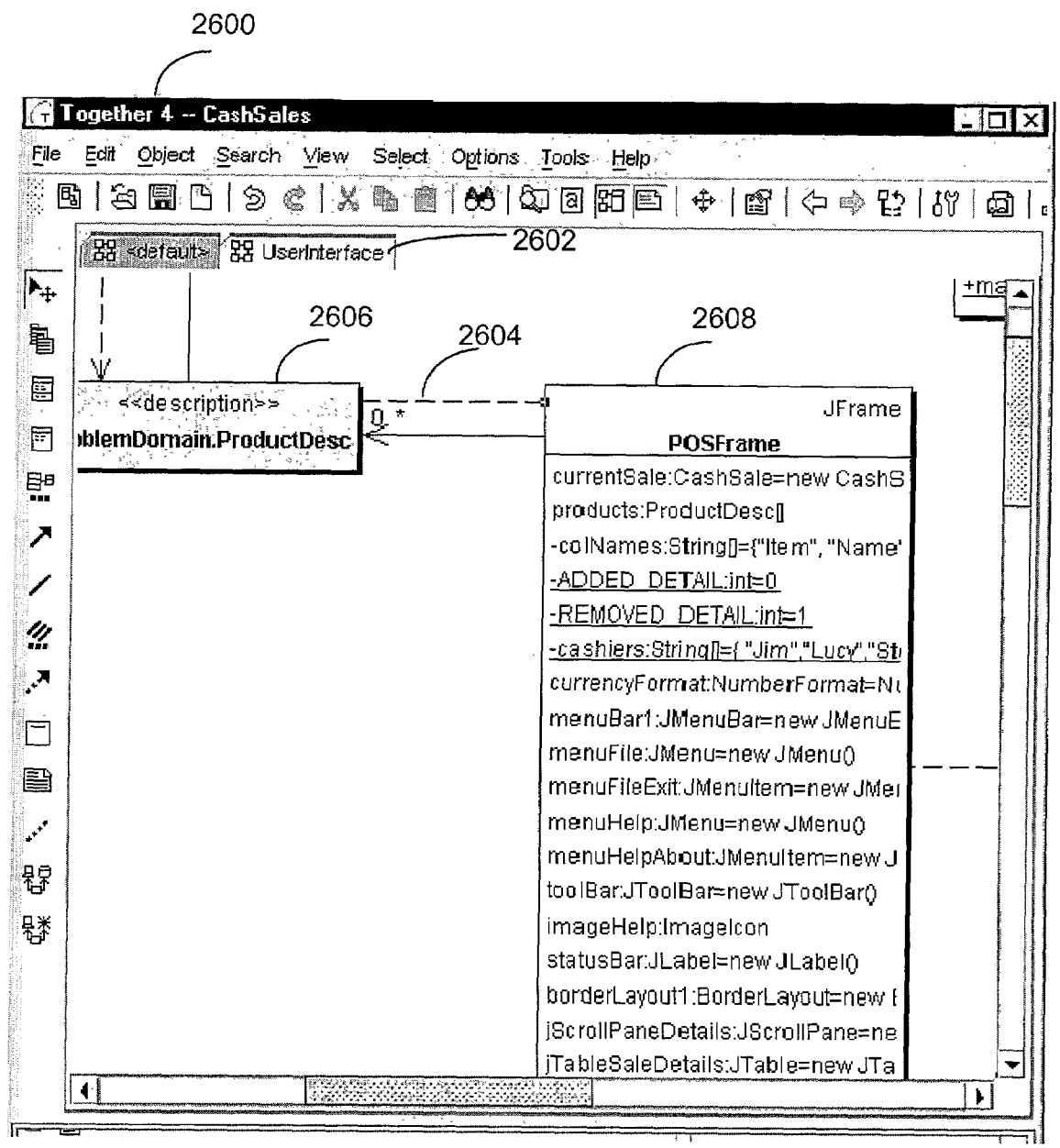
FIG. 26 depicts an exemplary screen showing a single dependency link between a class and a package displayed by the software development tool in FIG. 2 to reflect at least one dependency identified in code corresponding the class or to a different class in the package.

If the user were to display the object-oriented elements within package 2102, the software development tool would display exemplary user interface 2600 depicted in FIG. 26. As discussed above, class "POSFrame" 2512 within package "UserInterface" 2102 refers to class "ProdDesc" 2526. In FIG. 26, package "UserInterface" is represented by tab 2602, class "POSFrame" is represented by node 2608, and "ProdDesc" 2526 is an element in package "ProblemDomain.ProductDesc" represented by node 2606. In response to determining that a method in class "POSFrame" 2608 refers to class "ProductDesc" 2526 in package "ProblemDomain.ProductDesc," the software development tool displays the dependency link 2604 between class "POSFrame" 2608 and package "ProblemDomain.ProductDesc" 2606.

In the example depicted in FIG. 25, the software development tool identifies a single dependency link 2520 when the dependent node is "ProblemDomain" 2104 and the defining node is "DataManagement" 2106. The software development tool also identifies a single dependency link 2524 when the dependent node is "DataManagement" 2106 and the defining node is "ProblemDomain" 2104. Thus, in one implementation, the software development tool displays two dependency links between two nodes in opposite directions to represent dependencies in both directions. In an alternative embodiment, a single link (not shown) may be used to represent the dependency links in opposite directions.

Figure 27A:
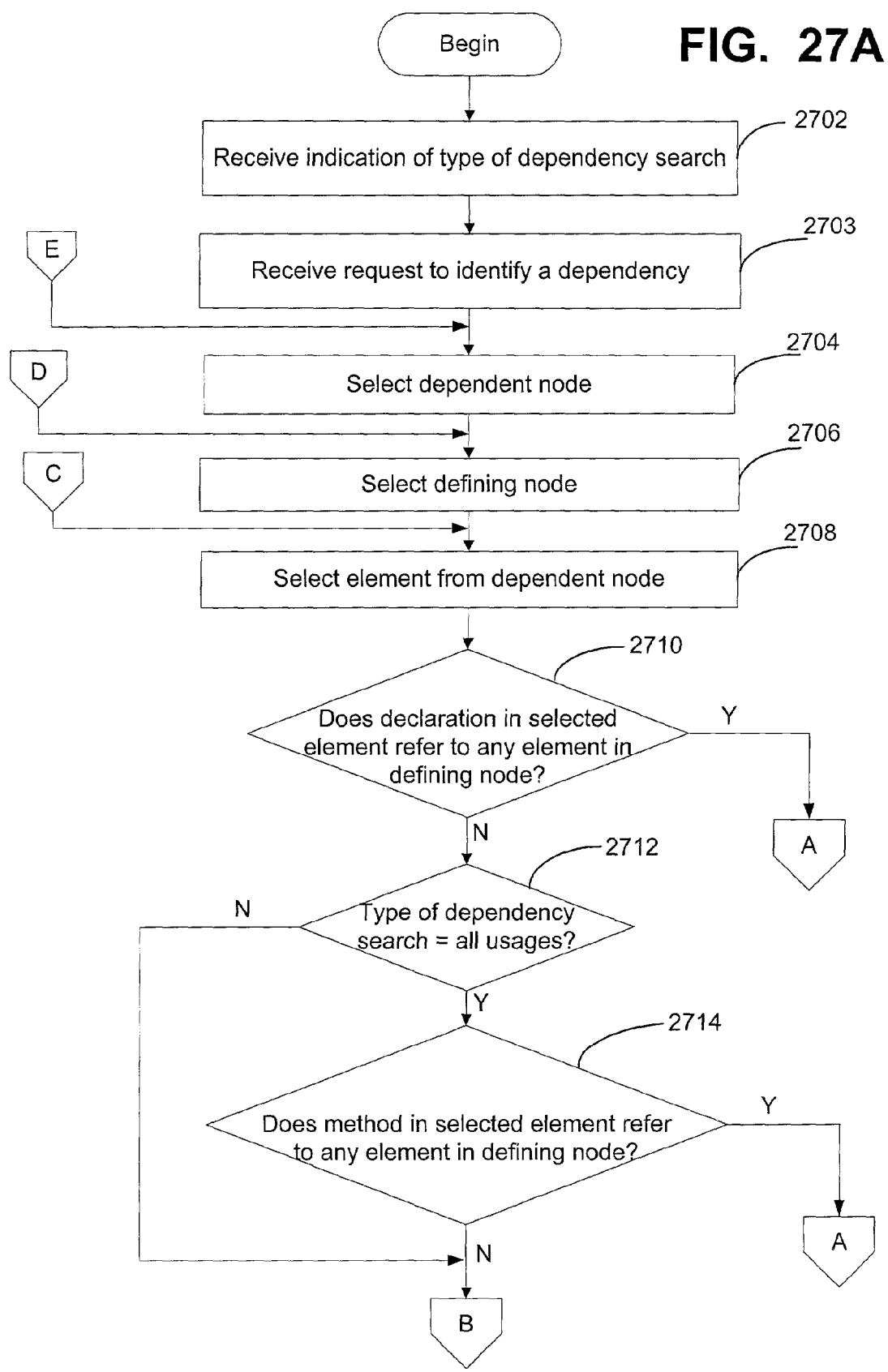
FIGS. 27A and 27B depict a flow diagram illustrating a second embodiment of a process performed by the software development tool in FIG. 2 to identify one or more dependencies between two nodes in a project.
Figure 27B:
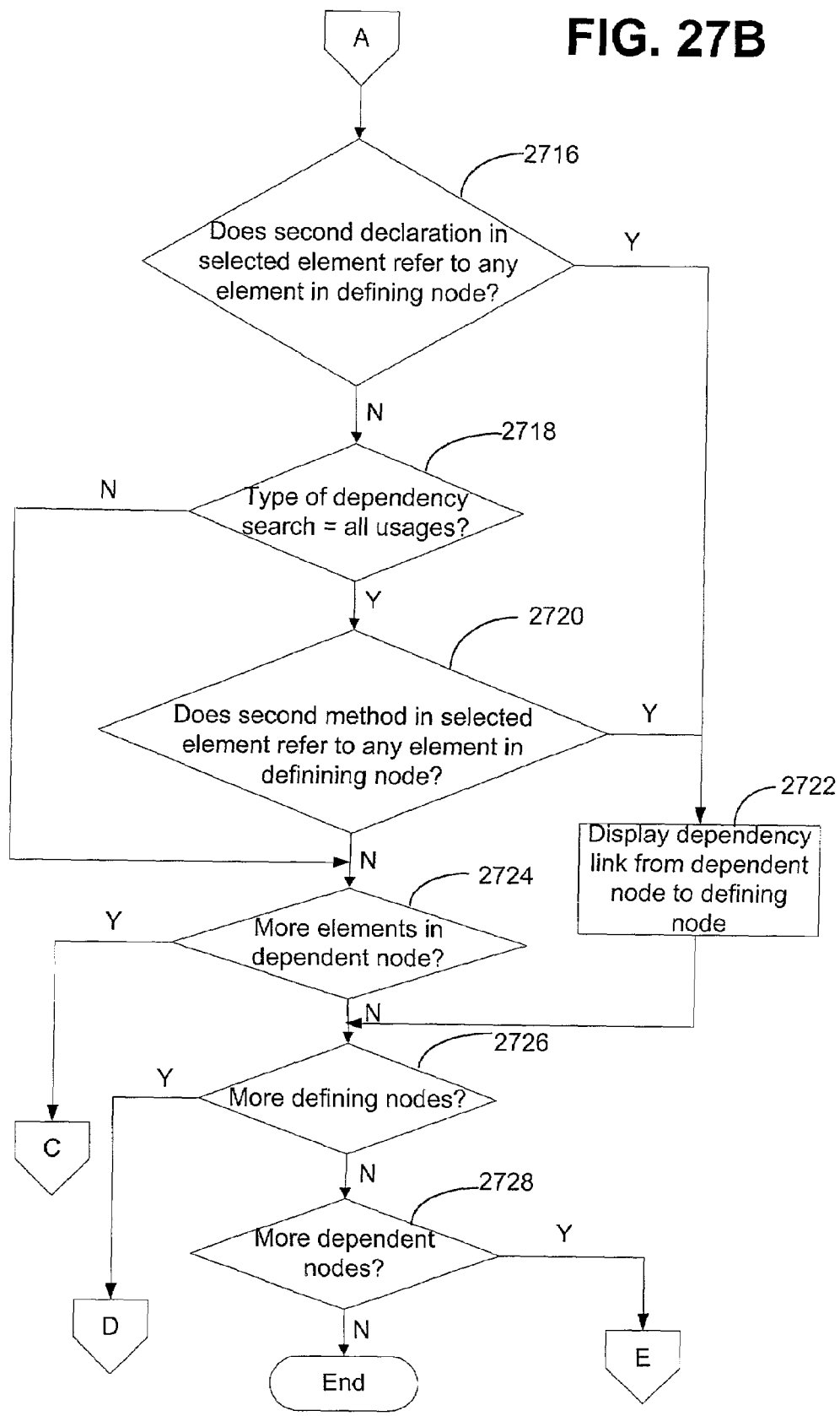

In an alternative implementation, the software development tool identifies at least two dependencies between the dependent node and the defining node before displaying a single dependency link between the two nodes. FIGS. 27A and 27B depict a flow diagram illustrating this embodiment. As with the previous embodiment, the steps are performed after the source code has been parsed and the graphical representation of the object-oriented elements in the source code has been displayed. Moreover, the initial steps performed by the software development tool are the same as with the previous embodiment. Thus, the software development tool initially receives an indication of a type of dependency search (step 2702). After receiving an indication of the type of dependency search, the software development tool receives a request to identify a dependency (step 2703). The next step performed by the software development tool is to select a dependent node (step 2704). The software development tool also selects a defining node (step 2706). The software development tool then selects an element from the dependent node (step 2708). After selecting the element from the dependent node, the software development tool determines whether a declaration in the selected element refers to any element in the defining node, also known as the defining element (step 2710). If no declaration in the selected element refers to any element in the defining node, the software development tool determines whether the type of dependency search is "all usages" (step 2712). If the developer chose to search "all usages," the software development tool determines whether a method in the selected element refers to any element in the defining node (step 2714).

If the software development tool determines that a dependency exists between the selected element and the defining node, i.e., if a method in the selected element refers to any element in the defining node or if a declaration in the selected element refers to an element in the defining node, the software development tool determines whether the second declaration in the selected element refers to any element in the defining node (step 2716 in FIG. 27B). If the second declaration refers to any element in the defining node, i.e., if a second dependency between the dependent node and the defining node is found, then the software development tool displays the dependency link from the dependent node to the defining node (step 2722). If the second declaration does not refer to any element in the defining node, then the software development tool determines whether the type of dependency search is "all usages" (step 2718). If the type of dependency search is "all usages," then the software development tool determines whether a second method in the selected element refers to any element in the defining node (step 2720). If the second method refers to an element in the defining node, then the software development tool displays the dependency link (step 2722).

If the second dependency is not identified at steps 2716 or 2720, the software development tool determines whether there are more elements in the dependent node (step 2724). Also, if the type of dependency search in step 2712 is not "all usages," the software development tool determines whether there are more elements in the dependent node (step 2724). If there are more elements, processing continues with the next element at step 2708. If all elements in the dependent node have been analyzed, the software development tool determines whether there are any more defining nodes (step 2726). If there are more defining nodes, processing continues with the next defining node at step 2706. If all defining nodes have been analyzed, the software development tool determines whether there are any more dependent nodes (step 2728). If there are more dependent nodes, processing continues with the next dependent node at step 2704. If all dependent nodes have been analyzed, processing ends.

Identifying and Displaying Details Regarding Dependencies

Methods and systems consistent with the present invention identify and display details for each dependency in a project to assist the developer in analyzing the code. Conventional tools identify the existence of dependencies between object-oriented elements, but fail to provide the developer with details regarding the types of dependencies between nodes and the elements within the nodes between which the dependencies exist. Thus, the developer must search the code to identify the particular dependencies that exist between the nodes. Methods and systems consistent with the present invention provide the developer with a list identifying the defining element, the dependent element, and the usage that results in the dependency. With this information, the developer can modify the code to reduce the number of dependencies between the nodes. With fewer dependencies, any further changes to the code are less likely to affect other parts of the code.

Figure 28B:
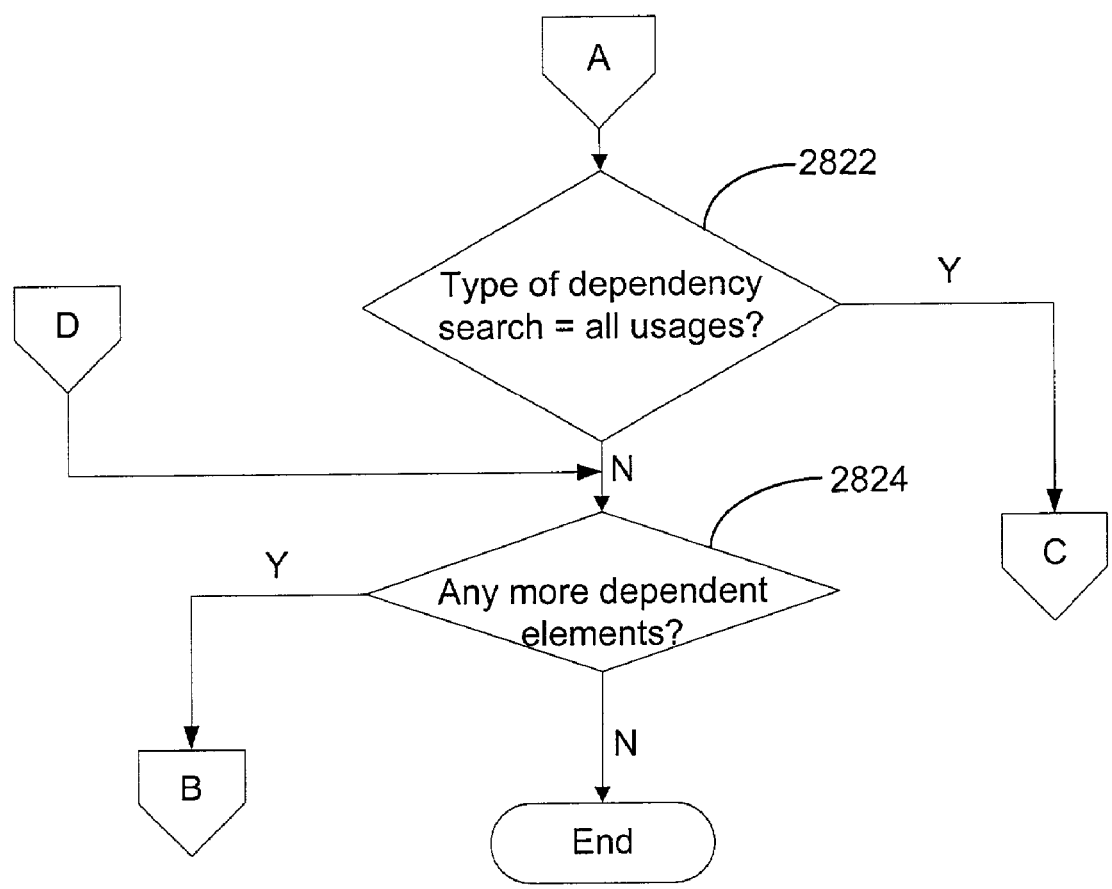
Figure 28C:
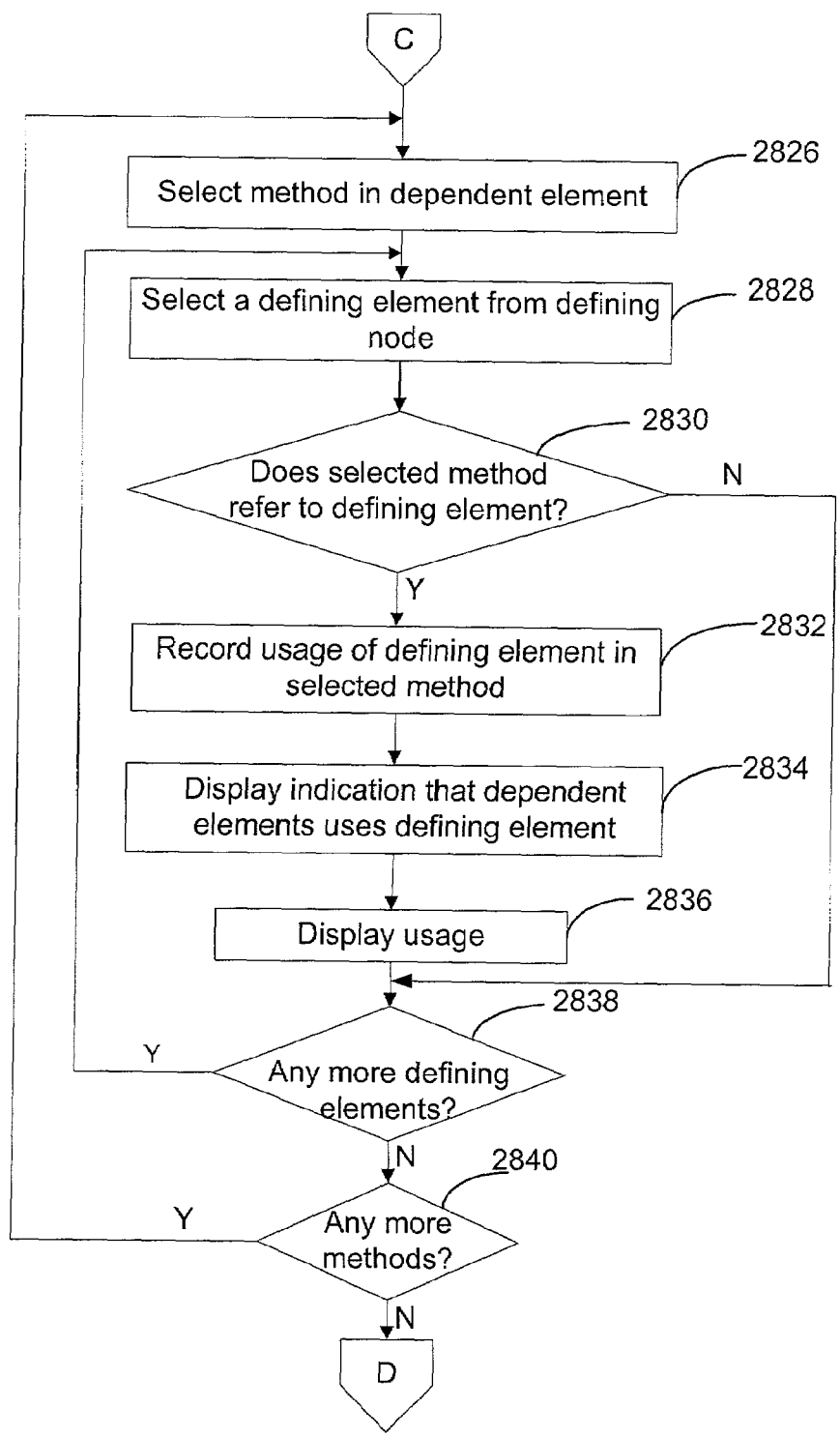
Figure 29:
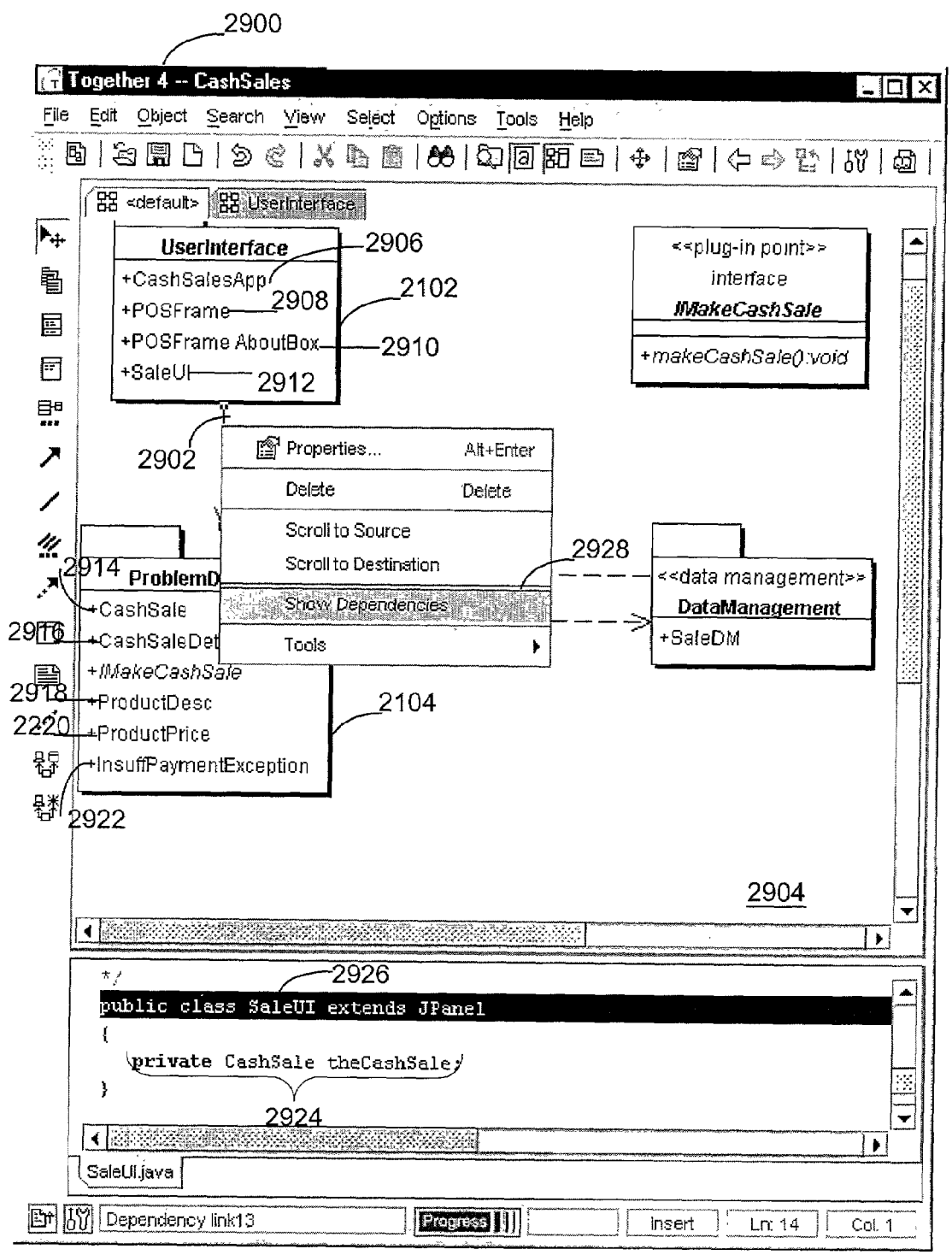
FIG. 29 depicts an exemplary user interface displayed by the software development tool depicted in FIG. 2 for requesting the software development tool to show all dependencies reflected by a single dependency link between a dependent package and a defining package.

FIGS. 28A, 28B, and 28C depict a flow diagram illustrating an exemplary process performed by the software development tool to identify and display the specific elements and usage that result in each dependency between a dependent node and a defining node. The software development tool initially receives an indication of a dependency link from a dependent node to a defining node (step 2802). In one implementation, the software development tool searches the code or the TMM, as described above, to identify the dependencies. Alternatively, if dependency links are already drawn, for example as displayed on the graphical pane 2904 in FIG. 29, the software development tool receives the display coordinates for the single dependency link 2902 when a developer uses a mouse or stylus to click on the single dependency link 2902. The TMM 200 identifies the symbol associated with the received display coordinates and provides this information to the software development tool, which correlates and stores the display coordinates of the single dependency link 2902 with the associated dependent node 2102, "Userinterface." In another implementation, the software development tool may store the display coordinates of the single dependency link 2902 with the associated defining node "ProblemDomain" 2104. The identified single dependency link 2902 limits the scope of a subsequent dependency search or analysis by the software development tool to the object-oriented elements in the dependent node "UserInterface" 2102, i.e., it limits the search to class "CashSalesApp" 2906, class "POSFrame" 2908, class "POSFrame AboutBox" 2910, and class "SaleUI" 2912. In addition, the identified single dependency link limits the search or analysis to identifying the use of the object-oriented elements in the defining node "ProblemDomain" 2104, i.e., it limits the search to class "CashSale" 2914, class "CashSaleDetail" 2916, class "ProductDesc" 2918, class "ProductPrice" 2220, and class "InsuffPaymentException" 2922.

The software development tool also receives an indication of a type of dependency search (step 2804). A developer may indicate to the software development tool the type of dependency search by any known programming input technique, such as selection of an option on a pull down menu, or a keyboard input. In another implementation, the software development tool may receive the indication of the type of dependency search from a system variable, such as a dependency check system variable 2302 shown in FIG. 23. In this implementation, the type of dependency search may be "declarations only" 2304 or "all usages" 2306. This allows the software development tool to limit the dependencies reflected by a single dependency link to only declarations. Examples of such declarations are the attribute declaration "private CashSale theCashSale" 2924 shown in FIG. 29 as code in class "SaleUI" 2926, or the declaration "Product aProd" made as an argument parameter for the method "addItem(Product aProd)" 2008 in FIG. 20.

The software development tool also receives a request to display dependencies reflected by the selected single dependency link (step 2806). In one implementation, the request to display dependencies may be received at the same time and be synonymous with the indication of a dependency link in step 2802. In another implementation shown in FIG. 29, the software development tool may receive the request via a developer selecting the option 2928 on a pull down menu. However, any known programming input technique may be used to indicate the request to the software development tool.

Having received the request to display dependencies, the software development tool limits the dependency search to the identified dependent node, "UserInterface" 2102. The software development tool then selects a dependent element from the dependent node (step 2808). The software development tool also selects a declaration from the dependent element (step 2810). The software development tool determines whether the selected declaration uses a defining element in the defining node (step 2812). In one implementation, the software development tool invokes the TMM 200 to identify each declaration in the corresponding code of the dependent element. In another implementation, the software development tool scans the code of the dependent element to find a declaration. For example, FIG. 30 depicts exemplary code corresponding to class "POSFrame" 3002. Class "POSFrame" 2123 is depicted graphically in FIG. 21 in relation to the dependent node 2102, "UserInterface." By invoking the TMM 200 or by scanning the file 2124, the software development tool identifies the declaration "ProductDesc[ ] products" 3004. The software development tool then determines that the declaration 3004 has an attribute type "ProductDesc[ ]" 3006 that refers to the defining element, class "ProductDesc" 3102, shown in FIG. 31. Class "ProductDesc" 2918 is depicted graphically in FIG. 29 in relation to the defining node "ProblemDomain" 2104.

Having identified that the declaration 3004 refers to the defining element 3006 in the defining node 2104, the software development tool records the usage of the defining element in the selected declaration of the dependent element (step 2814). The software development tool then displays an indication that the dependent element uses the defining element (step 2816). The software development tool also displays the usage (step 2818). The software development tool then checks whether there are any more declarations (step 2820). The software development tool also checks for additional declarations if the selected declaration does not use a defining element in the defining node. If there are more declarations, processing continues at step 2810 with the next declaration from the dependent element. If there are no more declarations in the dependent element, the software development tool determines whether the type of dependency search is "all usages" (step 2822 in FIG. 28B). If the search is not for "all usages," the software development tool determines whether there are any more dependent elements (step 2824). If there are more dependent elements, processing continues at step 2808 with the next dependent element from the dependent node. If there are no more dependent elements, processing is complete.

If the type of dependency search is "all usages," the software development tool will also identify and display dependencies from a dependent element having a method that refers to a defining element. The software development tool selects a method in the dependent element (step 2826 in FIG. 28C). The software development tool then selects a defining element from the defining node (step 2828). The software development tool determines whether the selected method refers to the defining element (step 2830). In determining whether the corresponding code of the dependent element has a method that refers to the defining element, the software development tool may invoke the TMM 200 to identify a method associated with the dependent element. In another implementation, the software development tool may scan the code of the dependent element to identify a method header and a method body that is in brackets (i.e., "{ }") following the method header. The software development tool may then search the body of the identified method for a usage of the defining element, such as in a local variable declaration, in a method invocation, or in a constructor. For example, the code for class "POSFrame" 3002 in FIG. 30 includes a method header 3010 for the method "setUpProducts" 3014. When analyzing the body 3012 of the method "setUpProducts" 3014 in the class "POSFrame" 3002, the software development tool identifies a constructor used in a local variable assignment (i.e., "products=new ProductDesc

[10]" 3016). The software development tool determines that the constructor in the local variable assignment 3016 refers to "ProductDesc( )" 3104 defined in the defining element, class "ProductDesc" 3102 in FIG. 31.

If the software development tool determines that the selected method refers to the defining element, the software development tool records the usage of the defining element in the selected method (step 2832). Thus, the software development tool stores the dependent element, class "POSFrame" 3002, and the defining element, class "ProductDesc" 3102, as well as the actual usage of the defining element within the dependent element so that a developer is aware of a cause of the identified dependency. Thus, the software development tool records the constructor in the local variable assignment 3016, in FIG. 30. The software development tool displays an indication that the dependent element uses the defining element (step 2834). The software development tool then displays the usage (step 2836).

Figure 32:
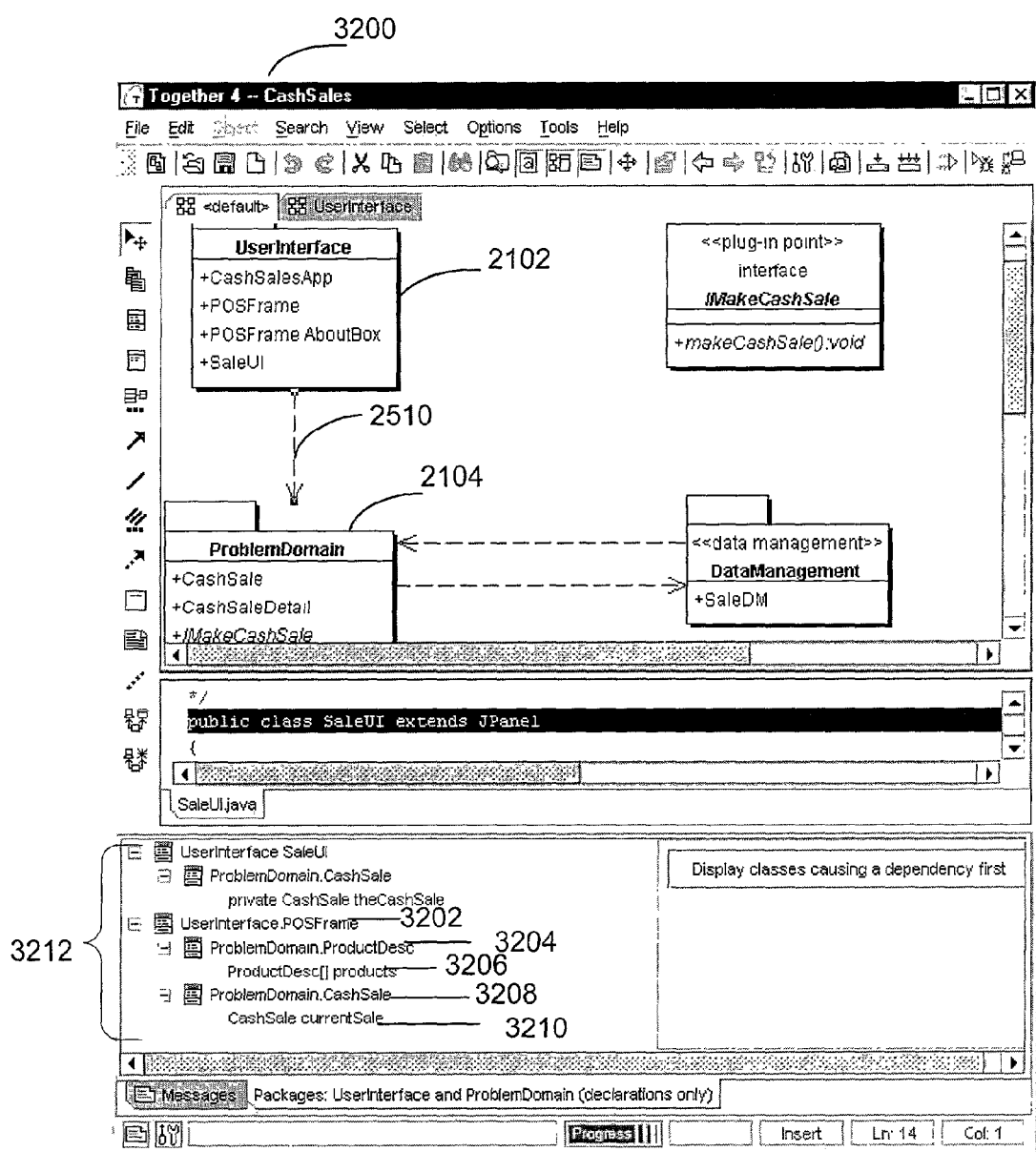
FIG. 32 depicts an exemplary user interface displayed by the software development tool depicted in FIG. 2, where the exemplary user interface shows all the dependencies reflected by the single dependency link between the dependent node and the defining node when the dependency search type is declarations.

In one implementation, as shown in FIG. 32, the software development tool displays the indication that the dependent element in the dependent node uses the defining element in the defining node by displaying an expandable directory tree with a root name that corresponds to the name of the dependent node and the name of the dependent element. Thus, for dependent node "UserInterface" and dependent element "POSFrame," the root name is "UserInterface.POSFrame" 3202. The software development tool also displays a dependent branch of the tree with a dependent branch name that corresponds to the name of the defining node and the name of the defining element. Thus for defining node "ProblemDomain" and defining element "ProductDesc," the dependent branch name is "ProblemDomain.ProductDesc" 3204. In this implementation, the software development tool displays each recorded usage as a respective name of a second branch off of the dependent branch. For example, a second branch 3206 off the dependent branch 3204 has a name corresponding to "ProductDesc[ ] products," which is the exemplary usage in the dependent element, class "POSFrame" 3002, recorded by the software development tool when the type of dependency search is "declarations only." In the example shown in FIG. 33, when the type of dependency search is "all usages," the software development tool also displays the recorded usage of the defining element in the method of the dependent element. For example, the software development tool displays the local variable assignment with the constructor 3016 in FIG. 30, as a recorded usage 3302 in FIG. 33. After displaying the usage, the software development tool checks whether there are any more defining elements (step 2838). The software development tool also checks whether there are any more defining elements if the selected method does not refer to defining elements. If there are more defining elements, processing continues at step 2828 with the next defining element from the defining node. Otherwise, the software development tool determines whether there are any more methods in the dependent element (step 2840). If so, processing continues at step 2826 with the next method in the dependent element. If there are no more methods, processing continues at step 2824.

Returning to the example shown in FIG. 32, the software development tool also identifies and records the indication that the dependent element, class "POSFrame" 3002, also uses another element, class "CashSale," in the defining node 2104, "ProblemDomain." This indication is displayed as a dependent branch "ProblemDomain.CashSale" 3208 of the expandable directory tree for "UserInterface.POSFrame" 3202. The recorded usage "CashSale currentSale" 3210 of the defining element, class "CashSale," in the defining node 2104 is also displayed by the software development tool.

Figure 33:
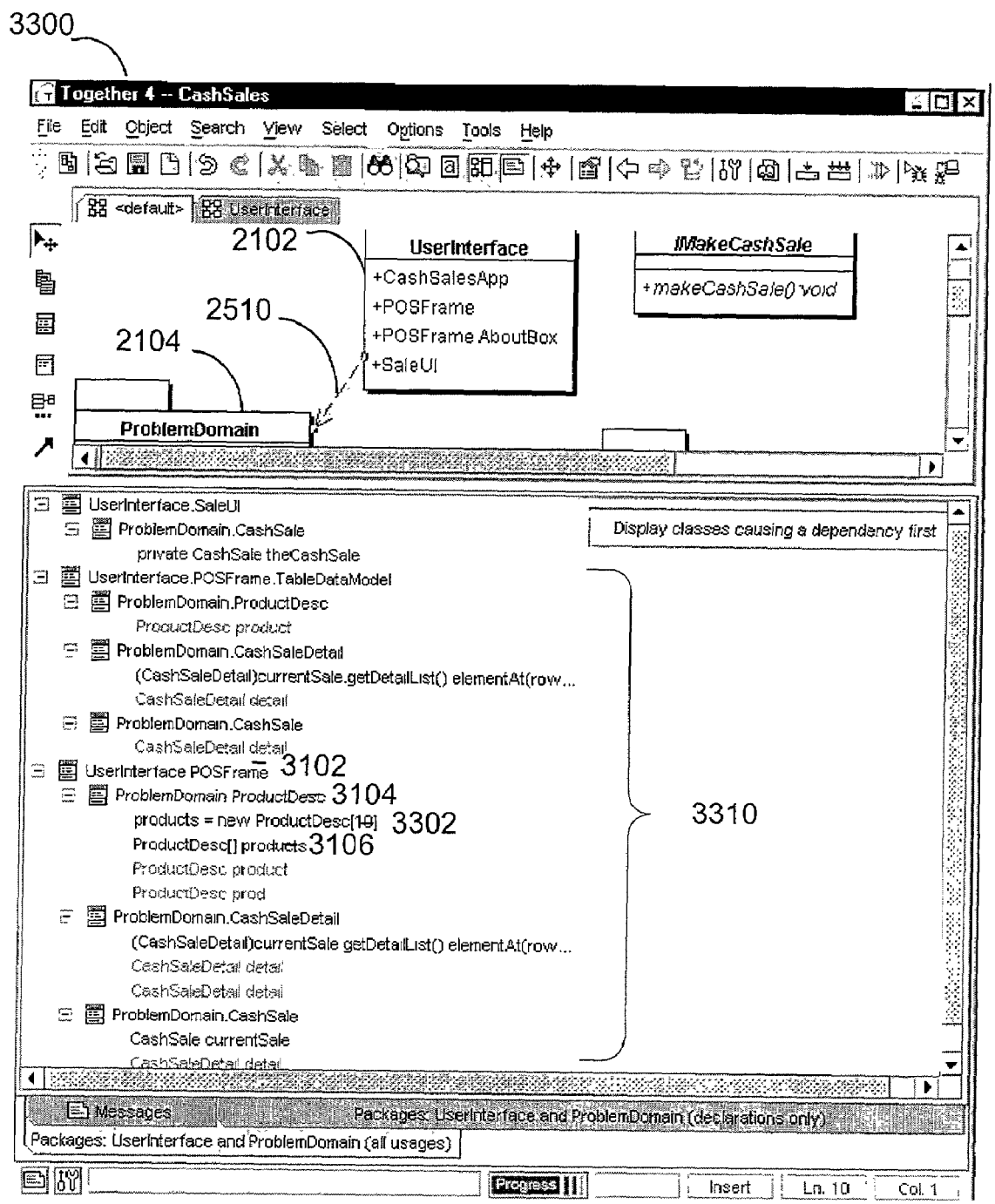
FIG. 33 depicts an exemplary user interface displayed by the software development tool depicted in FIG. 2, where the exemplary user interface shows all the dependencies reflected by the single dependency link between the dependent node and the defining node when the dependency search type is all usages.
Figure 34:
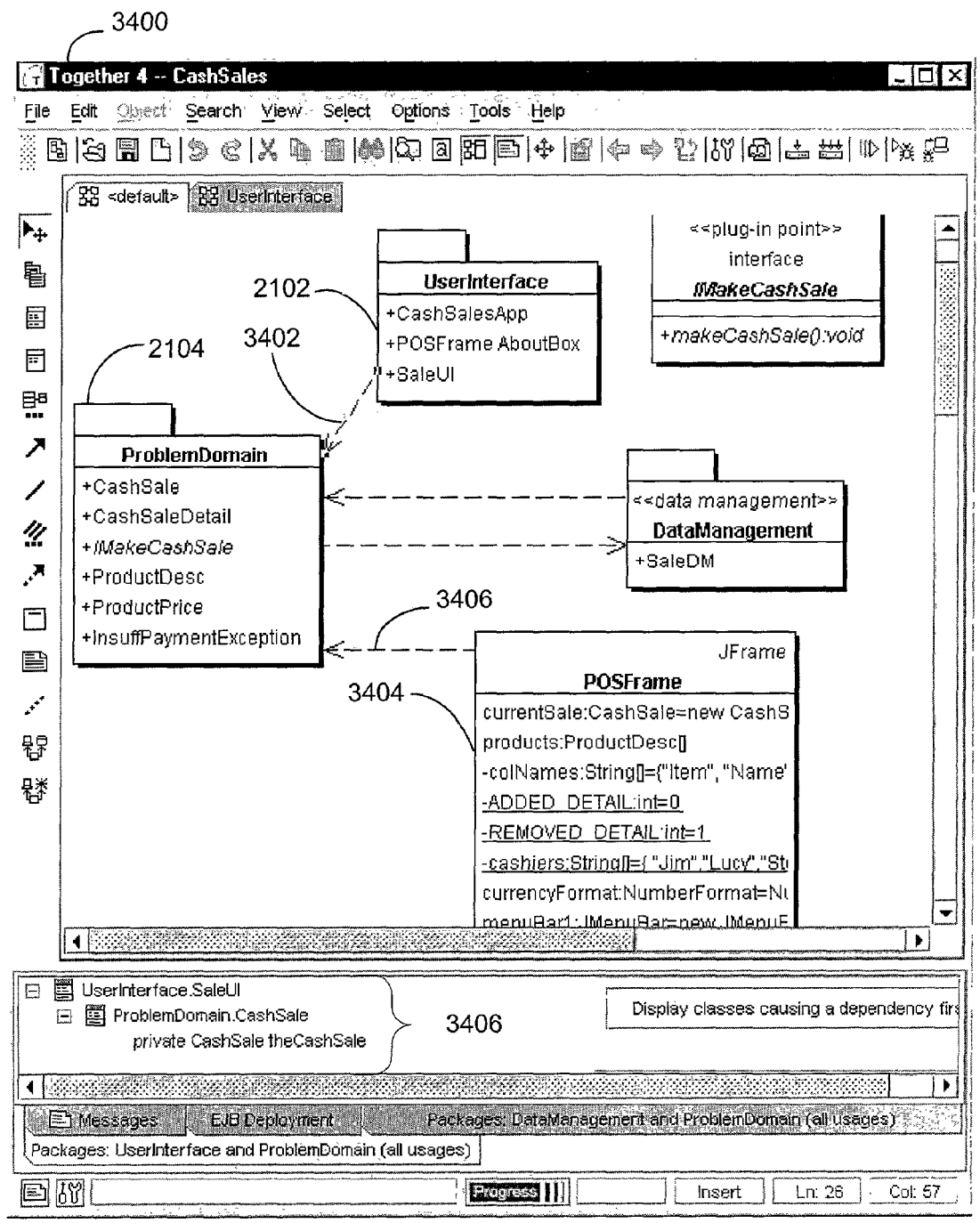
FIG. 34 depicts an exemplary user interface displayed by the software development tool depicted in FIG. 2, where the exemplary user interface shows the effect of removing an element having a dependency to a second node from a package.

In response to performing the process in FIGS. 28A, 28B and 28C, the software development tool identifies, records, and displays the multiple dependencies 3212, in FIG. 32, when the single dependency link 2510 is selected and when the type of dependency search is "declarations only." Similarly, the software development tool identifies, records, and displays the multiple dependencies 3310, in FIG. 33, when the single dependency link 2510 is selected and when the type of dependency search is "all usages." Methods and systems consistent with the present invention also allow a developer to track the dependencies between object-oriented elements when the elements are removed from their corresponding packages. For example, the effect of removing class "POSFrame" 3002 from package "UserInterface" 2102 and creating a new node for the removed class is depicted in FIG. 34. As depicted in FIGS. 32 and 33, the dependencies represented by link 2510 include dependencies from class "POSFrame," as identified by branch "UserInterface.POSFrame" 3202. If class POSFrame is removed from package UserInterface and a new node 3404 is created for class POSFrame, the software development tool will distinguish the dependencies originating from package "UserInterface" 2102 from those of class POSFrame 3404. Graphically, the dependencies from package UserInterface are illustrated as link 3402, whereas the dependencies from class POSFrame are illustrated as link 3406.

Figure 35:
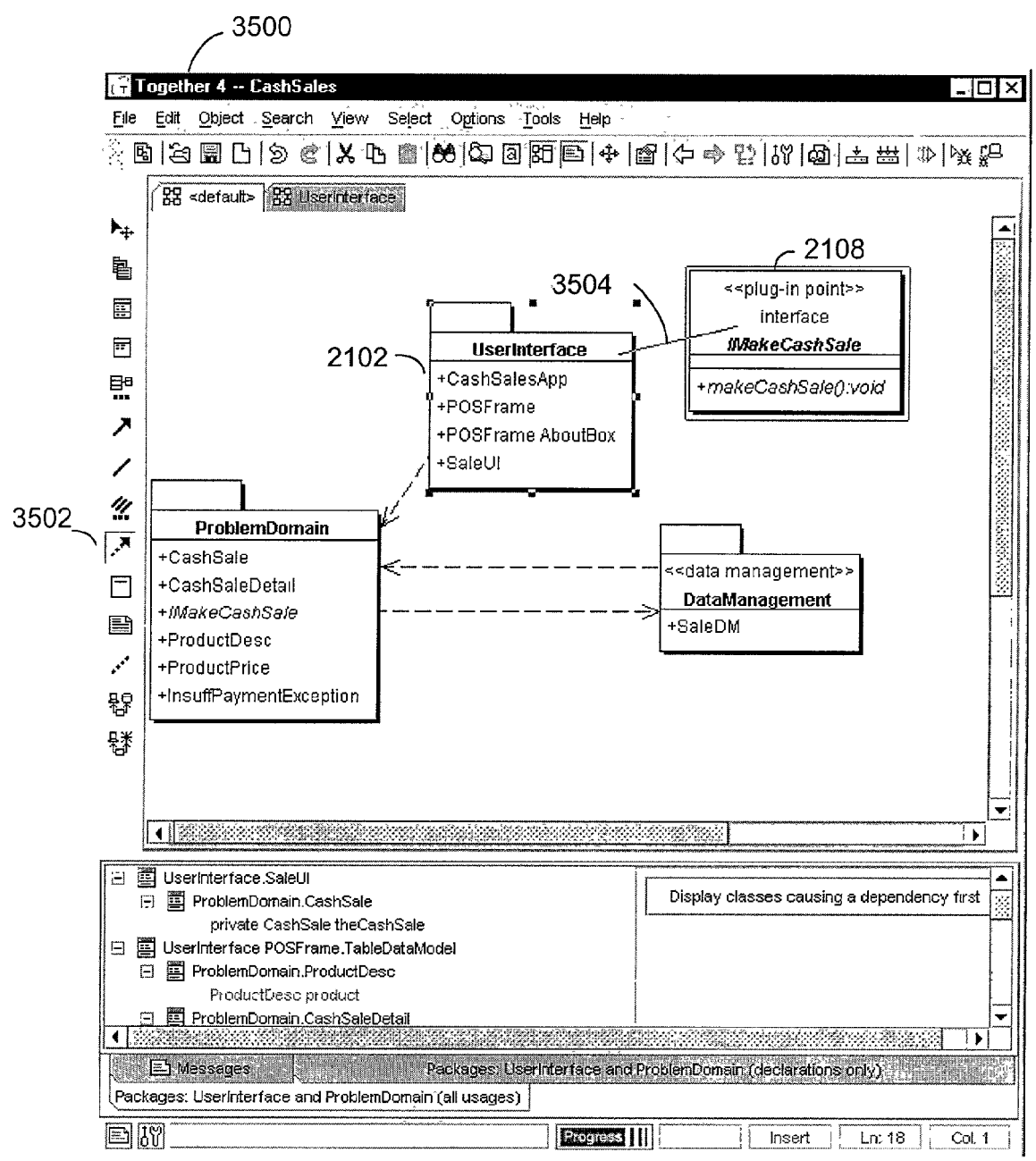
FIG. 35 depicts an exemplary user interface displayed by the software development tool depicted in FIG. 2, where the exemplary user interface shows a request from a developer to display a dependency link between an interface and a package without identifying if a dependency exists between the interface and the package.

The software development tool, in accordance with methods and systems consistent with the present invention, also allow a developer to manually draw a dependency between two nodes to determine whether any dependencies exist between those specific nodes. For example, FIG. 35 depicts an exemplary user interface displayed by the software development tool, where the exemplary user interface reflects a diagrammatic request 3504 received by the software development tool to form a dependency link between a selected dependent node 2102 and a selected defining node 2108. In the implementation shown in FIG. 35, the software development tool receives an indication to form a manual dependency link via an actuation of a button 3502 on the user interface screen 3500. In this implementation, the developer may indicate the dependent node 2102 to the software development tool via a mouse click on the dependent node 2102. The developer may then indicate the defining node 2108 to the software development tool by dragging and dropping a cursor on the defining node 2108 to complete the diagrammatic request 3504.

Figure 36:
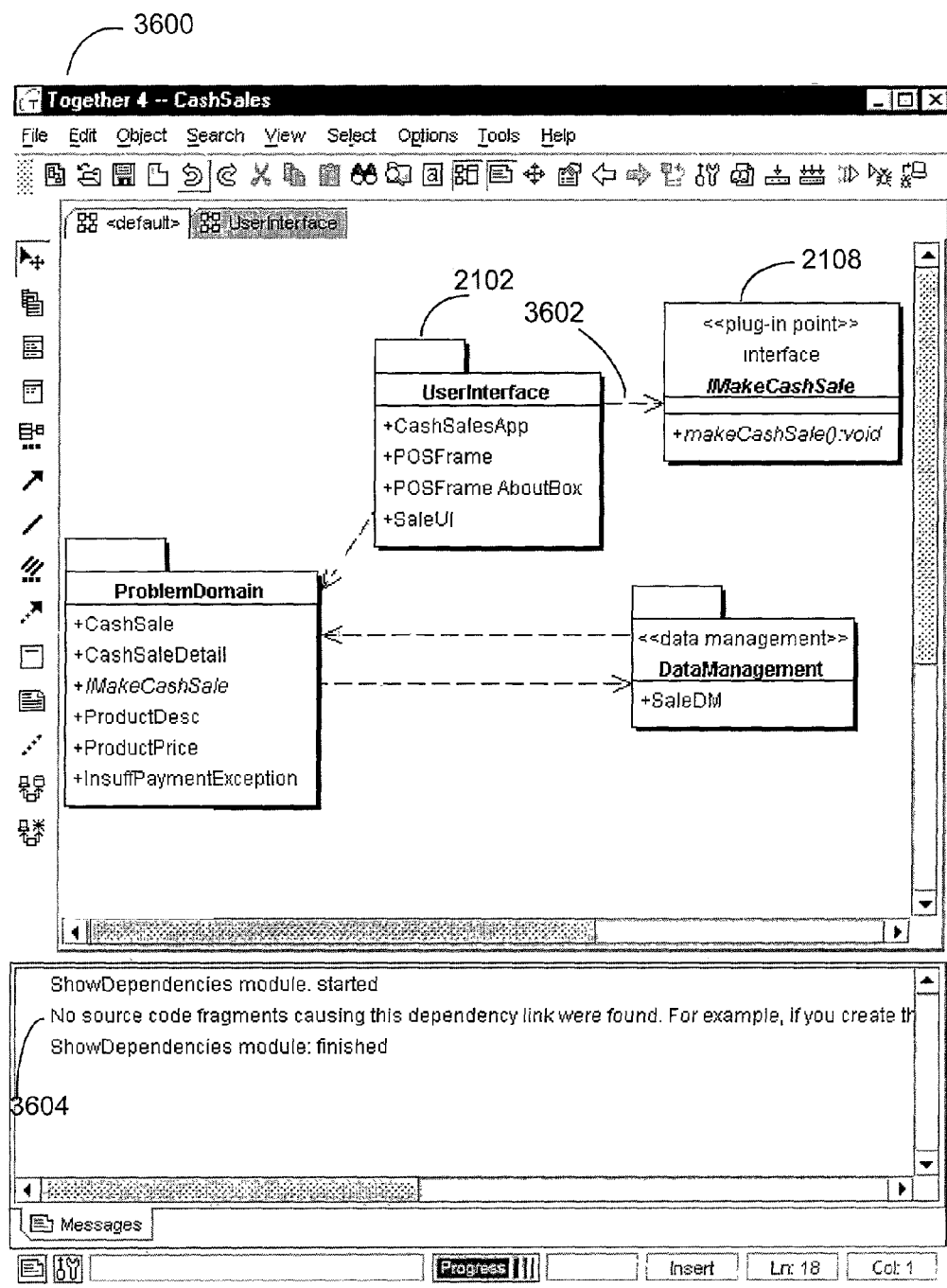
FIG. 36 depicts an exemplary user interface displayed by the software development tool depicted in FIG. 2, where the exemplary user interface shows the lack of dependencies reflected by the single dependency link requested by the developer between the interface and the package.

As shown in FIG. 36, the software development tool forms the manual dependency link 3602 in response to the indication to form the manual dependency link 3502 and the diagrammatic request 3504. The manual dependency link 3602 may not reflect any dependencies between the dependent node 2102 and the defining node 2108. The dependency link may, however, serve as visual reminder to the developer to create a dependency between the two nodes as the developer incorporates changes into the code corresponding to the dependent node 2102. Also, as shown in FIG. 36, in response to performing the process in FIGS. 28A, 28B and 28C when the identified single dependency link is the manual dependency link 3602, the software development tool displays a no dependencies message 3604 to indicate that no element in the dependent node 2102 uses or is dependent on any element in the defining node 2108.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a data processing system having a dependent node, a defining node, and a plurality of dependencies between the dependent node and the defining node, the method comprising the steps of:
displaying a graphical representation of the dependent node;
displaying a graphical representation of the defining node;
receiving an indication to identify a dependency between the dependent node and the defining node; and
in response to receiving the indication to identify the dependency, representing the plurality of dependencies as a number of links that is less than a number of the dependencies between the dependent node and the defining node.

2. The method of claim 1, wherein the plurality of dependencies is represented as a single link.

3. The method of claim 1, wherein each node comprises an element.

4. The method of claim 3, wherein one of the plurality of dependencies comprises a use of the defining node element by the dependent node element.

5. The method of claim 3, wherein one of the plurality of dependencies comprises a declaration of the defining node element by the dependent node element.

6. The method of claim 3, wherein one of the plurality of dependencies comprises a call to a method of the defining node element by the dependent node element.

7. The method of claim 3, wherein one of the plurality of dependencies comprises a local variable definition using the defining node element in a method of the dependent node element.

8. The method of claim 3, wherein the dependent node element comprises a class.

9. The method of claim 3, wherein the dependent node element comprises an interface.

10. The method of claim 3, wherein the defining node element comprises a class.

11. The method of claim 3, wherein the defining node element comprises an interface.

12. The method of claim 1, wherein the dependent node is selected from the group consisting of a class, an interface, and a package.

13. The method of claim 12, wherein the package comprises a plurality of elements.

14. The method of claim 13, wherein one of the plurality of elements comprises a class.

15. The method of claim 13, wherein one of the plurality of elements comprises an interface.

16. The method of claim 1, wherein the defining node is selected from the group consisting of a class, an interface, and a package.

17. The method of claim 16, wherein the package comprises a plurality of elements.

18. The method of claim 17, wherein one of the plurality of elements comprises a class.

19. The method of claim 17, wherein one of the plurality of elements comprises an interface.

20. A method in a data processing system having a plurality of nodes, each of the plurality of nodes having corresponding code, the method comprising the steps of:
displaying a graphical representation of the plurality of nodes;
determining whether the code corresponding to a first of the plurality of nodes contains a first use of a second of the plurality of nodes; and
when it is determined that the code corresponding to the first node contains the first use of the second node, determining whether the code corresponding to the first node contains a second use of the second node; and
when it is determined that the code corresponding to the first node contains the second use of the second node, displaying a dependency link between the graphical representation of the first node and the graphical representation of the second node.

21. The method of claim 20, wherein the first use comprises a declaration.

22. The method of claim 21, wherein the step of determining whether the code corresponding to the first node contains the first use of the second node comprises the step of searching the code corresponding to the first node for an attribute declaration that uses the second node.

23. The method of claim 21, wherein the step of determining whether the code corresponding to the first node contains the first use of the second node comprises the step of searching the code corresponding to the first node for an initializer of an attribute declaration that uses the second node.

24. The method of claim 21, wherein the step of determining whether the code corresponding to the first node contains the first use of the second node comprises the step of searching the code corresponding to the first node for an argument parameter of a method that uses the second node.

25. The method of claim 21, wherein the second use comprises a second declaration.

26. The method of claim 25, further comprising the steps of:
when it is determined that the code corresponding to the first node does not contain the second declaration of the second node, determining whether the code corresponding to the first node contains a call to a method of the second node; and
when it is determined that the code corresponding to the first node contains the call to the method of the second node, displaying a dependency link between the graphical representation of the first node and the graphical representation of the second node.

27. The method of claim 25, further comprising the steps of:
when it is determined that the code corresponding to the first node does not contain the second declaration of the second node, determining whether the code corresponding to the first node comprises a method having a local variable definition using the second node; and
when it is determined that the code corresponding to the first node comprises a method having the local variable definition using the second node, displaying a dependency link between the graphical representation of the first node and the graphical representation of the second node.

28. The method of claim 20, wherein the first use of the second node comprises a call to a method of the second node.

29. The method of claim 28, wherein the second use of the second node comprises a second call to the method of the second node.

30. The method of claim 29, further comprising the steps of:
when it is determined that the code corresponding to the first node does not contain the second call to the method of the second node, determining whether the code corresponding to the first node comprises a method having a local variable definition using the second node; and when it is determined that the code corresponding to the first node comprises a method having the local variable definition using the second node, displaying a dependency link between the graphical representation of the first node and the graphical representation of the second node.

31. The method of claim 29, further comprising the steps of:

when it is determined that the code corresponding to the first node does not contain the second call to the method of the second node, determining whether the code corresponding to the first node contains a declaration of the second node; and when it is determined that the code corresponding to the first node contains the declaration of the second node, displaying a dependency link between the graphical representation of the first node and the graphical representation of the second node.

32. The method of claim 20, wherein the first use of the second node comprises a local variable definition using the second node in a method of the first node.

33. The method of claim 32, wherein the second use of the second node comprises a local variable definition using the second node in a method of the first node.

34. The method of claim 20, wherein the first node is selected from the group consisting of a class, an interface, and a package.

35. The method of claim 20, wherein the second node is selected from the group consisting of a class, an interface, and a package.

36. A method in a data processing system having a plurality of nodes, each of the plurality of nodes having corresponding code, the method comprising the steps of:

receiving an indication of a first of the plurality of nodes;

receiving an indication of a second of the plurality of nodes;

determining whether the code corresponding to the first node contains a first use of the second node; and when it is determined that the code corresponding to the first node contains the first use of the second node, determining whether the code corresponding to the first node contains a second use of the second node; and when it is determined that the code corresponding to the first node contains the second use of the second node, displaying a dependency link between the graphical representation of the first node and the graphical representation of the second node.

37. The method of claim 36, wherein the first use comprises a declaration.

38. The method of claim 37, wherein the second use comprises a second declaration.

39. The method of claim 38, further comprising the steps of:

when it is determined that the code corresponding to the first node does not contain the second declaration of the second node, determining whether the code corresponding to the first node contains a call to a method of the second node; and when it is determined that the code corresponding to the first node contains the call to the method of the second node, displaying a dependency link between the graphical representation of the first node and the graphical representation of the second node.

40. The method of claim 38, further comprising the steps of:

when it is determined that the code corresponding to the first node does not contain the second declaration of the second node, determining whether the code corresponding to the first node comprises a method having a local variable definition using the second node; and when it is determined that the code corresponding to the first node comprises the method having the local variable definition using the second node, displaying a dependency link between the graphical representation of the first node and the graphical representation of the second node.

41. The method of claim 36, wherein the first use comprises a call to a method of the second node.

42. The method of claim 41, wherein the second use comprises a call to the method of the second node.

43. The method of claim 41, further comprising the steps of:

when it is determined that the code corresponding to the first node does not contain a second call to the method of the second node, determining whether the code corresponding to the first node comprises a method having a local variable definition using the second node; and when it is determined that the code corresponding to the first node comprises a method having the local variable definition using the second node, displaying a dependency link between the graphical representation of the first node and the graphical representation of the second node.

44. The method of claim 36, wherein the first use of the second node comprises a local variable definition using the second node in a method of the first node.

45. The method of claim 44, wherein the second use of the second node comprises a local variable definition using the second node in a method of the first node.

46. The method of claim 36, wherein the first node is selected from the group consisting of a class, an interface, and a package.

47. The method of claim 36, wherein the second node is selected from the group consisting of a class, an interface, and a package.

48. A method in a data processing system having a plurality of nodes, each of the plurality of nodes having corresponding code, the method comprising the steps of:

receiving an indication of a first of the plurality of nodes;

receiving an indication of a second of the plurality of nodes;

determining whether the code corresponding to the first node contains a use of the second node; and when it is determined that the code corresponding to the first node contains the use of the second node, displaying the usage of the second node by the first node.

49. The method of claim 48, wherein each node comprises an element.

50. The method of claim 49, wherein when it is determined that the code corresponding to the first node contains the use of the second node, the method further comprises the step of displaying the first node element.

51. The method of claim 50, further comprising the step of displaying the first node with the first node element and with the usage to visually indicate that the first node contains the usage of the second node.

52. The method of claim 49, wherein when it is determined that the code corresponding to the first node contains the use of the second node, the method further comprises the step of displaying the second node element.

53. The method of claim 56, further comprising the step of displaying the second node with the second node element and with the usage to visually indicate that the first node contains the usage of the second node.

54. The method of claim 48, wherein the first node is selected from the group consisting of a class, an interface, and a package.

55. The method of claim 48, wherein the second node is selected from the group consisting of a class, an interface, and a package.

56. A computer-readable medium containing instructions for controlling a data processing system to perform a method, the data processing system having a dependent node, a defining node, and a plurality of dependencies between the dependent node and the defining node, the method comprising the steps of:
displaying a graphical representation of the dependent node;
displaying a graphical representation of the defining node;
receiving an indication to identify a dependency between the dependent node and the defining node; and
in response to receiving the indication to identify the dependency, representing the plurality of dependencies as a number of links that is less than a number of the dependencies between the dependent node and the defining node.

57. The computer-readable medium of claim 56, wherein the plurality of dependencies is represented as a single link.

58. The computer-readable medium of claim 56, wherein each node comprises an element.

59. The computer-readable medium of claim 58, wherein one of the plurality of dependencies comprises a use of the defining node element by the dependent node element.

60. The computer-readable medium of claim 58, wherein one of the plurality of dependencies comprises a declaration of the defining node element by the dependent node element.

61. The computer-readable medium of claim 58, wherein one of the plurality of dependencies comprises a call to a method of the defining node element by the dependent node element.

62. The computer-readable medium of claim 58, wherein one of the plurality of dependencies comprises a local variable definition using the defining node element in a method of the dependent node element.

63. The computer-readable medium of claim 58, wherein the dependent node element comprises a class.

64. The computer-readable medium of claim 58, wherein the dependent node element comprises an interface.

65. The computer-readable medium of claim 58, wherein the defining node element comprises a class.

66. The computer-readable medium of claim 58, wherein the defining node element comprises an interface.

67. The computer-readable medium of claim 56, wherein the dependent node is selected from the group consisting of a class, an interface and a package.

68. The computer-readable medium of claim 67, wherein the package comprises a plurality of elements.

69. The computer-readable medium of claim 68, wherein one of the plurality of elements comprises a class.

70. The computer-readable medium of claim 68, wherein one of the plurality of elements comprises an interface.

71. The computer-readable medium of claim 56, wherein the defining node is selected from the group consisting of a class, an interface and a package.

72. The computer-readable medium of claim 71, wherein the package comprises a plurality of elements.

73. The computer-readable medium of claim 72, wherein one of the plurality of elements comprises a class.

74. The computer-readable medium of claim 72, wherein one of the plurality of elements comprises an interface.

75. A computer-readable medium containing instructions for controlling a data processing system to perform a method, the data processing system having a plurality of nodes, each of the plurality of nodes having corresponding code, the method comprising the steps of:
displaying a graphical representation of the plurality of nodes;
determining whether the code corresponding to a first of the plurality of nodes contains a first use of a second of the plurality of nodes; and
when it is determined that the code corresponding to the first node contains the first use of the second node, determining whether the code corresponding to the first node contains a second use of the second node; and
when it is determined that the code corresponding to the first node contains the second use of the second node, displaying a dependency link between the graphical representation of the first node and the graphical representation of the second node.

76. The computer-readable medium of claim 75, wherein the first use comprises a declaration.

77. The computer-readable medium of claim 76, wherein the step of determining whether the code corresponding to the first node contains the first use of the second node comprises the step of searching the code corresponding to the first node for an attribute declaration that uses the second node.

78. The computer-readable medium of claim 76, wherein the step of determining whether the code corresponding to the first node contains the first use of the second node comprises the step of searching the code corresponding to the first node for an initializer of an attribute declaration that uses the second node.

79. The computer-readable medium of claim 76, wherein the step of determining whether the code corresponding to the first node contains the first use of the second node comprises the step of searching the code corresponding to the first node for an argument parameter of a method that uses the second node.

80. The computer-readable medium of claim 76, wherein the second use comprises a second declaration.

81. The computer-readable medium of claim 80, wherein when it is determined that the code corresponding to the first node does not contain the second declaration of the second node, the method further comprises the steps of:
determining whether the code corresponding to the first node contains a call to a method of the second node; and
when it is determined that the code corresponding to the first node contains the call to the method of the second node, displaying a dependency link between the graphical representation of the first node and the graphical representation of the second node.

82. The computer-readable medium of claim 80, wherein when it is determined that the code corresponding to the first node does not contain the second declaration of the second node, the method further comprises the steps of:
determining whether the code corresponding to the first node comprises a method having a local variable definition using the second node; and when it is determined that the code corresponding to the first node comprises a method having the local variable definition using the second node, displaying a dependency link between the graphical representation of the first node and the graphical representation of the second node.

83. The computer-readable medium of claim 75, wherein the first use of the second node comprises a call to a method of the second node.

84. The computer-readable medium of claim 83, wherein the second use of the second node comprises a second call to the method of the second node.

85. The computer-readable medium of claim 84, wherein when it is determined that the code corresponding to the first node does not contain the second call to the method of the second node, the method further comprises the steps of:
   determining whether the code corresponding to the first node comprises a method having a local variable definition using the second node; and
   when it is determined that the code corresponding to the first node comprises a method having the local variable definition using the second node, displaying a dependency link between the graphical representation of the first node and the graphical representation of the second node.

86. The computer-readable medium of claim 84, wherein when it is determined that the code corresponding to the first node does not contain the second call to the method of the second node, the method further comprises the steps of:
   determining whether the code corresponding to the first node contains a declaration of the second node; and
   when it is determined that the code corresponding to the first node contains the declaration of the second node, displaying a dependency link between the graphical representation of the first node and the graphical representation of the second node.

87. The computer-readable medium of claim 75, wherein the first use of the second node comprises a local variable definition using the second node in a method of the first node.

88. The computer-readable medium of claim 87, wherein the second use of the second node comprises a second local variable definition using the second node in a method of the first node.

89. The computer-readable medium of claim 75, wherein the first node is selected from the group consisting of a class, an interface, and a package.

90. The computer-readable medium of claim 75, wherein the second node is selected from the group consisting of a class, an interface, and a package.

91. A computer-readable medium containing instructions for controlling a data processing system to perform a method, the data processing system having a plurality of nodes, each of the plurality of nodes having corresponding code, the method comprising the steps of:
   receiving an indication of a first of the plurality of nodes;
   receiving an indication of a second of the plurality of nodes;
   determining whether the code corresponding to the first node contains a first use of the second node; and
   when it is determined that the code corresponding to the first node contains the first use of the second node, determining whether the code corresponding to the first node contains a second use of the second node; and
   when it is determined that the code corresponding to the first node contains the second use of the second node, displaying a dependency link between the graphical representation of the first node and the graphical representation of the second node.

92. The computer-readable medium of claim 91, wherein the first use comprises a declaration.

93. The computer-readable medium of claim 92, wherein the second use comprises a second declaration.

94. The computer-readable medium of claim 93, wherein:
   when it is determined that the code corresponding to the first node does not contain the second declaration of the second node, determining whether the code corresponding to the first node contains a call to a method of the second node; and
   when it is determined that the code corresponding to the first node contains the call to the method of the second node, displaying a dependency link between the graphical representation of the first node and the graphical representation of the second node.

95. The computer readable medium of claim 93, wherein:
   when it is determined that the code corresponding to the first node does not contain the second declaration of the second node, determining whether the code corresponding to the first node comprises a method having a local variable definition using the second node; and
   when it is determined that the code corresponding to the first node comprises a method having the local variable definition using the second node, displaying a dependency link between the graphical representation of the first node and the graphical representation of the second node.

96. The computer-readable medium of claim 91, wherein the first use of the second node comprises a call to a method of the second node.

97. The computer-readable medium of claim 96, wherein the second use comprises a second call to the method of the second node.

98. The computer-readable medium of claim 97, wherein:
   when it is determined that the code corresponding to the first node does not contain the second call to the method of the second node, determining whether the code corresponding to the first node comprises a method having a local variable definition using the second node
   when it is determined that the code corresponding to the first node comprises a method having the local variable definition using the second node, displaying a dependency link between the graphical representation of the first node and the graphical representation of the second node.

99. The computer-readable medium of claim 91, wherein the first use of the second node comprises a local variable definition using the second node in a method of the first node.

100. The computer-readable medium of claim 99, wherein the second use of the second node comprises a second local variable definition using the second node in a method of the first node.

101. The computer-readable medium of claim 91, wherein the first node is selected from the group consisting of a class, an interface, and a package.

102. The computer-readable medium of claim 91, wherein the second node is selected from the group consisting of a class, an interface, and a package.

103. A computer-readable medium containing instructions for controlling a data processing system to perform a method, the data processing system having a plurality of nodes, each of the plurality of nodes having corresponding code, the method comprising the steps of:
receiving an indication of a first of the plurality of nodes;
receiving an indication of a second of the plurality of nodes;
determining whether the code corresponding to the first node contains a use of the second node; and
when it is determined that the code corresponding to the first node contains the use of the second node, displaying the usage of the second node by the first node.

104. The computer-readable medium of claim 103, wherein each node comprises an element.

105. The computer-readable medium of claim 104, wherein when it is determined that the code corresponding to the first node contains the use of the second node, the method further comprises the step of displaying the first node element.

106. The computer-readable medium of claim 105, wherein the method further comprises the step of displaying the first node with the first node element and with the usage to visually indicate that the first node contains the usage of the second node.

107. The computer-readable medium of claim 104, wherein when it is determined that the code corresponding to the first node contains the use of the second node, the method further comprises the step of displaying the second node element.

108. The computer-readable medium of claim 107, wherein the method further comprises the step of displaying the second node with the second node element and with the usage to visually indicate that the first node contains the usage of the second node.

109. The computer-readable medium of claim 103, wherein the first node is selected from the group consisting of a class, an interface, and a package.

110. The computer-readable medium of claim 103, wherein the second node is selected from the group consisting of a class, an interface, and a package.

111. A data processing system comprising:
a secondary storage device further comprising a plurality of nodes, each of the plurality of nodes having corresponding code;
a memory device further comprising a program that displays a graphical representation of the plurality of nodes, that
determines whether the code corresponding to a first of the plurality of nodes contains a first use of a second of the plurality of nodes, and
when it is determined that the code corresponding to the first node contains the first use of the second node, the program determines whether the code corresponding to the first node contains a second use of the second node, and
when it is determined that the code corresponding to the first node contains the second use of the second node, the program displays a dependency link between the graphical representation of the first node and the graphical representation of the second node; and
a processor for running the program.

112. The data processing system of claim 111, wherein the first node is selected from the group comprising a class, and interface, and a package.

113. The data processing system of claim 111, wherein the second node is selected from the group comprising a class, an interface, and a package.

114. The data processing system of claim 111, wherein the first use comprises a declaration.

115. The data processing system of claim 114, wherein the second use comprises a second declaration.

116. The data processing system of claim 115, wherein when it is determined that the code corresponding to the first node does not contain the second declaration of the second node, the program
determines whether the code corresponding to the first node contains a call to a method of the second node, and
when it is determined that the code corresponding to the first node contains the call to the method of the second node, the program displays a dependency link between the graphical representation of the first node and the graphical representation of the second node.

117. The data processing system of claim 115, wherein when it is determined that the code corresponding to the first node does not contain the second declaration of the second node, the program
determines whether the code corresponding to the first node comprises a method having a local variable definition using the second node, and
when it is determined that the code corresponding to the first node comprises a method having the local variable definition using the second node, the program displays a dependency link between the graphical representation of the first node and the graphical representation of the second node.

118. The data processing system of claim 111, wherein the first use of the second node comprises a call to a method of the second node.

119. The data processing system of claim 118, wherein the second use of the second node comprises a second call to the method of the second node.

120. The data processing system of claim 119, wherein when it is determined that the code corresponding to the first node does not contain the second call to the method of the second node, the program
determines whether the code corresponding to the first node comprises a method having a local variable definition using the second node, and
when it is determined that the code corresponding to the first node comprises a method having the local variable definition using the second node, the program displays a dependency link between the graphical representation of the first node and the graphical representation of the second node.

121. The data processing system of claim 119, wherein when it is determined that the code corresponding to the first node does not contain the second call to the method of the second node, the program
determines whether the code corresponding to the first node contains a declaration of the second node, and
when it is determined that the code corresponding to the first node contains the declaration of the second node, the program displays a dependency link between the graphical representation of the first node and the graphical representation of the second node.

122. A data processing system comprising:
a secondary storage device further comprising a plurality of nodes, each of the plurality of nodes having corresponding code;
a memory device further comprising a program that receives an indication of a first of the plurality of nodes, that receives an indication of a second of the plurality of nodes, that determines whether the code corresponding to the first node contains a first use of the second node, and when it is determined that the code corresponding to the first node contains the first use of the second node, the program determines whether the code corresponding to the first node contains a second use of the second node, and when it is determined that the code corresponding to the first node contains the second use of the second node, the program displays a dependency link between the graphical representation of the first node and the graphical representation of the second node; and a processor for running the program.

123. The data processing system of claim 122, wherein the first node is selected from the group consisting of a class, an interface, and a package.

124. The data processing system of claim 122, wherein the second node is selected from the group consisting of a class, an interface, and a package.

125. The data processing system of claim 122, wherein the first use and the second use each comprise a declaration.

126. The data processing system of claim 122, wherein the first use and the second use each comprise a call to a method.

127. A data processing system comprising:

a secondary storage device further comprising a plurality of nodes, each of the plurality of nodes having corresponding code;

a memory device further comprising a program that receives an indication of a first of the plurality of nodes, that receives an indication of a second of the plurality of nodes, that determines whether the code corresponding to the first node contains a use of the second node, and when it is determined that the code corresponding to the first node contains the use of the second node, the program displays the usage of the second node by the first node; and a processor for running the program.

128. The data processing system of claim 127, wherein each node comprises an element.

129. The data processing system of claim 128, wherein when it is determined that the code corresponding to the first node contains the use of the second node, the program further displays the first node element.

130. The data processing system of claim 129, wherein the program further displays the first node with the first node element and with the usage to visually indicate that the first node contains the usage of the second node.

131. The data processing system of claim 128, wherein when it is determined that the code corresponding to the first node contains the use of the second node, the program further displays the second node element.

132. The data processing system of claim 131, wherein the program further displays the second node with the second node element and with the usage to visually indicate that the first node contains the usage of the second node.

133. The data processing system of claim 127, wherein the first node is selected from the group comprising a class, an interface, and a package.

134. The data processing system of claim 127, wherein the second node is selected from the group comprising a class, an interface, and a package.

135. A system having a dependent node, a defining node, and a plurality of dependencies between the dependent node and the defining node, the system comprising:

means for displaying a graphical representation of the dependent node;

means for displaying a graphical representation of the defining node;

means for receiving an indication to identify a dependency between the dependent node and the defining node; and means for representing the plurality of dependencies as a number of links that is less than a number of the dependencies between the dependent node and the defining node in response to receiving the indication to identify the dependency.

\* \* \* \* \*